(12) United States Patent
Kodaypak

(10) Patent No.: US 10,075,827 B1
(45) Date of Patent: Sep. 11, 2018

(54) SYSTEM AND METHOD FOR MACHINE TO MACHINE SUBSCRIBER INFORMATION AND RETRIEVAL PROTECTION

(71) Applicant: AT&T Intellectual Property I, L.P., Atlanta, GA (US)

(72) Inventor: Rajendra Prasad Kodaypak, Sammamish, WA (US)

(73) Assignee: AT&T Intellectual Proprety I, L.P., Atlanta, GA (US)

( * ) Notice: Subject to any disclaimer, the term of this patent is extended or adjusted under 35 U.S.C. 154(b) by 10 days.

(21) Appl. No.: 15/452,270

(22) Filed: Mar. 7, 2017

(51) Int. Cl.
*H04W 4/00* (2018.01)
*H04W 4/70* (2018.01)
*H04W 72/04* (2009.01)
*H04W 28/02* (2009.01)

(52) U.S. Cl.
CPC ............. *H04W 4/70* (2018.02); *H04W 4/005* (2013.01); *H04W 28/0247* (2013.01); *H04W 72/048* (2013.01)

(58) Field of Classification Search
CPC . H04W 4/70; H04W 28/0247; H04W 72/048; H04W 4/005
See application file for complete search history.

(56) References Cited

U.S. PATENT DOCUMENTS

| | | | |
|---|---|---|---|
| 8,626,850 B2 * | 1/2014 | Park | H04W 4/18 455/466 |
| 8,818,426 B2 | 8/2014 | Jain et al. | |
| 9,215,550 B2 | 12/2015 | Xu | |
| 9,215,552 B2 | 12/2015 | Jain et al. | |
| 9,432,150 B2 | 8/2016 | Jain et al. | |
| 9,432,822 B2 | 8/2016 | Stojanovski | |
| 9,549,424 B2 | 1/2017 | Mademann et al. | |
| 2015/0119083 A1 | 4/2015 | Chandramouli et al. | |
| 2015/0189460 A1 | 7/2015 | Zhang et al. | |
| 2015/0282145 A1 | 10/2015 | Kim et al. | |
| 2015/0334560 A1 | 11/2015 | Zhang et al. | |
| 2016/0044593 A1 | 2/2016 | Anpat et al. | |
| 2016/0112897 A1 | 4/2016 | Kunz et al. | |
| 2016/0278147 A1 * | 9/2016 | Adrangi | H04W 4/70 |

FOREIGN PATENT DOCUMENTS

KR 10-1479948 B1 1/2015

OTHER PUBLICATIONS

Machine Type Communications (MTC/CIoT); https://www.developingsolutions.com/solutions/machine-type-communications-mtcm2m/; 4 pages.

* cited by examiner

Primary Examiner — Afshawn M Towfighi
(74) Attorney, Agent, or Firm — Baker & Hostetler LLP

(57) ABSTRACT

Systems and methods utilize a machine type communication interworking function and mapping function to manage and route requests from a variety of devices in data networks.

20 Claims, 11 Drawing Sheets

SYSTEM AND METHOD FOR MACHINE TO MACHINE SUBSCRIBER INFORMATION AND RETRIEVAL PROTECTION

TECHNICAL FIELD

This disclosure relates generally to network management and, more specifically, to facilitate increased use of machine to machine communication.

BACKGROUND

An increasing number of Internet of Things (IoT) devices, and other smart devices, include independent network connectivity. Such connectivity facilitates enhanced functionality, remote control, and other improvements. To provide such connectivity, however, mobile service providers need to support an increasing number of IoT services, often across multiple industry segments, such as automotive, utility meters, vending machines, and healthcare. Managing the associated traffic volume and maintaining the identity of originators and targets of network transmissions has become more challenging.

Accordingly, what is needed are new techniques for traffic management to aid in providing service for increased numbers of connected devices and associated traffic.

SUMMARY

In embodiments, a system comprises a communication interworking function configured to interpret an application request from an application server or user equipment. The communication interworking function is further configured to resolve routing for the application request based on application request information and a real-time integrated mapping table. The system also includes a mapping function of the communication interworking function configured to maintain the real-time integrated mapping table of the user equipment and the application server based on entity information from an entity database.

In embodiments, a method comprises providing a communication interworking function having a mapping function and invoking the mapping function of the communication interworking function in response to an application request. The mapping function maintains a real-time integrated mapping table of user equipment and an application server associated with the application request based on entity information from an entity database. The method further comprises extracting application server information associated with the application server from an entity database. The application server information includes an identity of a serving node of the application server. The method also comprises determining a routing to the application server based on the application server information and the serving node.

In embodiments, a method comprises providing a communication interworking function having a mapping function and invoking a mapping function of the communication interworking function in response to an application request. The mapping function maintains a real-time integrated mapping table of user equipment and an application server associated with the application request based on entity information from an entity database. The method further comprises extracting user equipment information associated with the user equipment from an entity database. The user equipment information includes an identity of a serving node of the user equipment. The method further comprises determining a routing to the user equipment based on the user equipment information and the serving node.

These and other embodiments are described in greater detail elsewhere herein.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
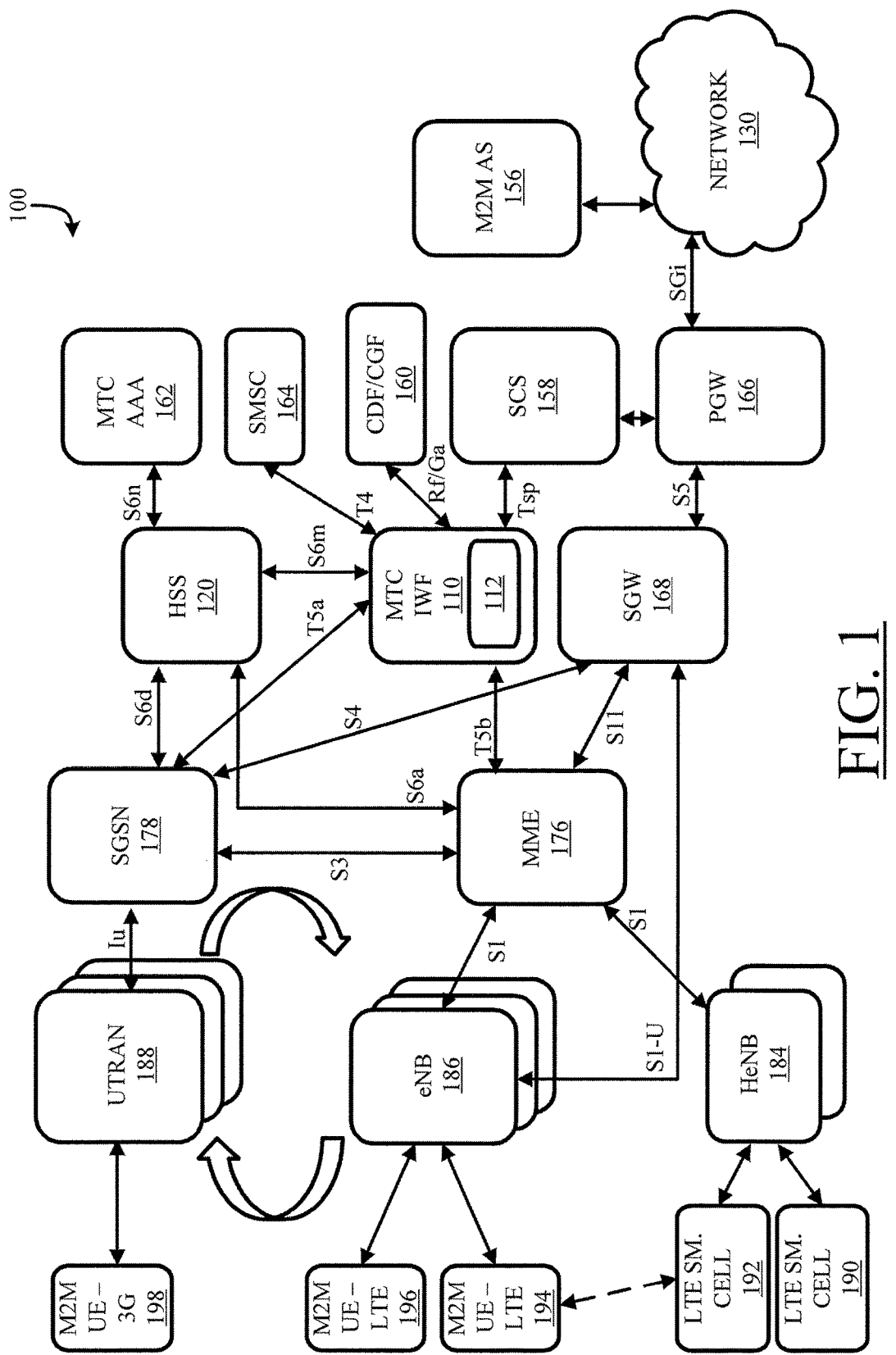
FIG. 1 illustrates a block diagram of an example network employing aspects of the disclosure herein.

Aspects herein are directed to systems and methods for managing machine to machine (M2M) communication in networks, and particularly involve a networking function, such as a machine type communication (MTC) interworking function (IWF) (referred to together as "MTC-IWF").

One challenge associated with the growth in signaling traffic due to increasing numbers of IoT devices is the potential for signaling storms which disrupt the core network elements including their functional and operational integrity. Legacy networks lacking flexible mapping functions, dynamic network monitoring, overload detection, and protection mechanisms for handling signaling protocols that are used to carry M2M traffic may result in unforeseen service impacts across one or more industry verticals. Solutions must be implemented across a wide range of platforms or be interoperable with various platforms as M2M systems contemplated herein will leverage a variety of connection means and other resources, such as LTE/LTE-Advanced (LTE/LTE), 5G capable virtual network infrastructure, and 3GPP/IETF defined capabilities within the access and core network elements as well as the database systems, as well as aspects disclosed herein such as interworking functions, application servers, their programmable application programming interfaces (APIs) and other interfaces.

When enabled, cellular M2M devices are registered in the mobility core network home subscriber server (HSS) before they gain access to any specific application related to their IoT functionality or capabilities via the M2M application server (AS). When a large volume of M2M devices are triggered by their ASs, the serving MTC-IWF needs to interact with the HSS on an interface (e.g., S6m diameter interface) to identify the subscriber and its serving core network nodes in the network to route the subscriber information requests (SIR). The HSS may be handling several other interfaces (e.g., diameter interfaces) towards the core network elements at the same time, which may result in overload or resource preemption conditions resulting from M2M SIR triggering in excess of particular volumes. In accordance with aspects herein, accurate mapping of M2M devices within the MTC-IWF based on subscription retrieval information from the HSS can be used to ensure the device triggers are routed to the correct serving nodes. While aspects herein are described in terms of HSSs, these can more generally refer to any entity databases containing relevant entity information relating to location, subscriptions, permissions, attributes, et cetera.

A dynamic mapping function can be used in a MTC-IWF. The mapping function is capable of retrieving the subscription information from the HSS and mapping it to the external identity that it receives from a given application server or set of servers. The mapping function is capable of adaptively updating its context information as the network functions are dynamically instantiated in data centers. In addition, based on a closed-loop layered dynamic overload control detection and protection mechanism that works in conjunction with both MTC-IWF and HSS network elements, the mapping function facilitates MTC-IWF routing of device triggers toward mobility management entities (MMEs) or edge signaling gateways that will eventually serve the devices. "Device trigger" is used generally to refer to a wide variety of activity. "Application request" may also be used in this regard, referring to one-way or two-way interactions between transmission originators and recipients in networks described. Further, with regard to feedback received from network elements and other aspects, "communication attributes" can be monitored. While varying terms are used herein for purposes of example, communication attributes can be aspects such as, e.g., peer (or other) node traffic utilization, proximity, routing complexity, transport latency, interface traffic data, equipment condition, et cetera. Communication attributes can be analyzed and employed herein based on historical, current, or projected metrics.

In high-speed mobility networks carrying M2M traffic, the M2M application (which can be, e.g., within the UE or leveraged by UE while hosted elsewhere) interacts with M2M application servers that are dedicated to serve a given type or class of IoT devices. Such communication be carried, e.g., on the control plane, on the user plane, or others. These communications utilize 3GPP standards defined interfaces between the individual network elements within the mobility networks.

In LTE/LTE-A mobile operator network environments, IoT devices, when enabled in a given coverage area, can procure radio resource control (RRC) connections by the serving radio access network (RAN) and thereafter attach to a serving MME upon completing the authentication and location exchange procedures. Connectivity to the serving MME is utilized when these devices are triggered for specific actions by a serving AS.

The M2M ASs are connected to the serving capability servers (SCSs). The SCSs are controlled by, e.g., a MTC provider or a mobile operator, and interface with the MTC-IWF over an interface (e.g., Tsp diameter interface). The MTC-IWF can interact with the HSS on an alternative interface (e.g., S6m diameter interface). For each trigger for an IoT device (or device group), the serving MTC-IWF needs to identify a serving MME for that specific device (or group of devices) to initiate communication (e.g., on a control plane) via an interface (e.g., T5b diameter interface). The MTC-IWF needs to be MME topology-aware to facilitate routing of device triggers as these can be transitioned into or implemented as virtualized network functions and may be instantiated in data centers on demand based on traffic dynamics and resource management.

These and other aspects are illustrated in, e.g., FIG. 1, showing a portion of a network 100 including MTC-IWF 110 having mapping function 112. A variety of other elements show interaction and communication between network elements. Throughout FIG. 1, various interfaces (e.g., diameter interfaces) are indicated along communication lines. However, while shown as such to illustrate one possible embodiment, these should not be construed as limiting, as other interfaces or communication means can be utilized herewith without departing from the scope or spirit of the innovation.

M2M AS 156 (or multiple M2M application servers) can be connected to network 130 (e.g., the Internet, proprietary networks) providing connectivity to packet data network gateway (PGW) 166, thereby establishing communication with the core or regional carrier network. PGW 166 is communicatively coupled with at least SCS 158 and serving gateway (SGW) 168. SCS 158 is communicatively coupled with the MTC-IWF 110. SGW 168 is communicatively coupled with MME 176 and various access points such as eNodeBs 186.

MME 176 can also be operatively coupled with, e.g., various access points such as eNodeBs 186, Home eNodeBs (HeNodeBs) 184, serving general packet radio service (GPRS) support node (SGSN) 178, and HSS 120, as well as the MTC-IWF 110. SGSN 178 can also be communicatively coupled with Universal Terrestrial Radio Access Network (UTRAN) nodes 188.

HSS 120 is communicatively coupled with SGSN 178 and MTC AAA 162. HSS 120 is also communicatively coupled with MTC-IWF 110, which itself can also be coupled with short message service center (SMSC) 164 and charging data function/charging gateway function (CDF/CGF) 160.

A variety of UE connects to this architecture. One or more devices of 3G M2M UE 198 can connect to the network using UTRAN nodes 188. Various 4G/LTE devices such as LTE M2M UE 196 and 194 connect through eNodeBs 186. These can also be communicatively coupled in embodiments to LTE small cells such as LTE small cell 192 or 190. LTE small cells 192 and 190 can connect to the carrier network using HeNodeBs 184.

FIG. 1 and other drawings herein illustrate a variety of connections for carrying communications. To the extent that the communications have an originating sender and target recipient, "intermediary network elements" can be used generally to refer to any variety of elements through which the communication is transmitted, or which support routing and delivery of the transmission. For example, where an AS sends an application request, the SCS can be an intermediary element, and where UE sends an application request, the RAN and/or MME can be intermediary elements.

In some carrier networks, there may be multiple combination pairs of M2M ASs and SCSs that may interact with several virtualized instances of MTC-IWFs in a distributed arrangement. These MTC-IWFs can connect to a dedicated virtual HSS, distributed HSS pairs, or multiple HSSs for IoT applications. As these virtual instances may be created or destroyed based on, e.g., traffic dynamics, mapping of such instances as well as subscription identities facilitate routing of device triggers in a high-speed mobility network. Device triggering, when initiated by several M2M AS-SCS pairs at the same time via the MTC-IWF on a particular interface (e.g., S6m interface) may drive an HSS into overload, such as if an HSS is already processing several other transactions over multiple signaling interfaces to provide mobility triple/quad-play services.

Figure 2A:
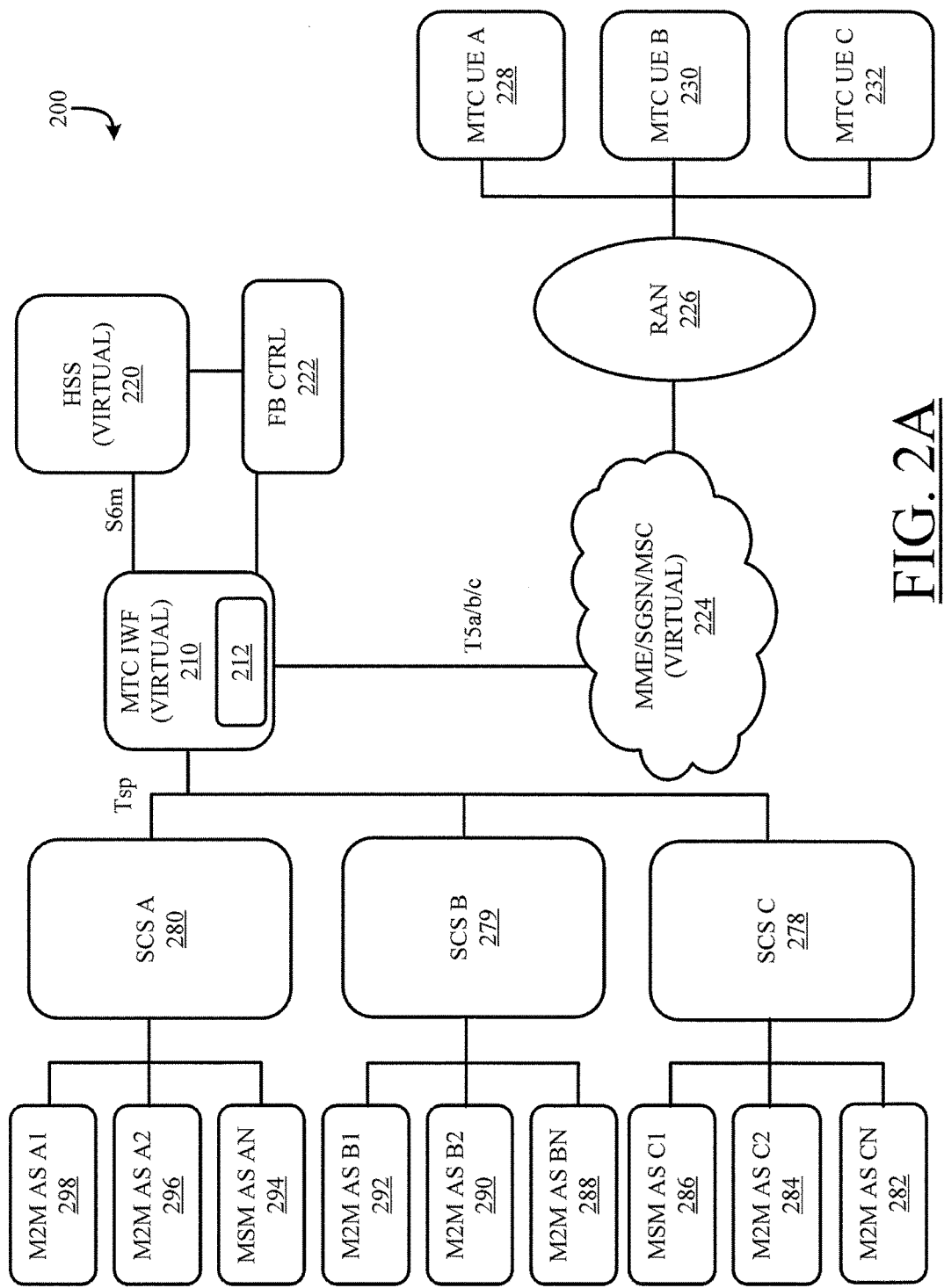
FIG. 2A illustrates a block diagram of an example network employing aspects of the disclosure herein.
Figure 2B:
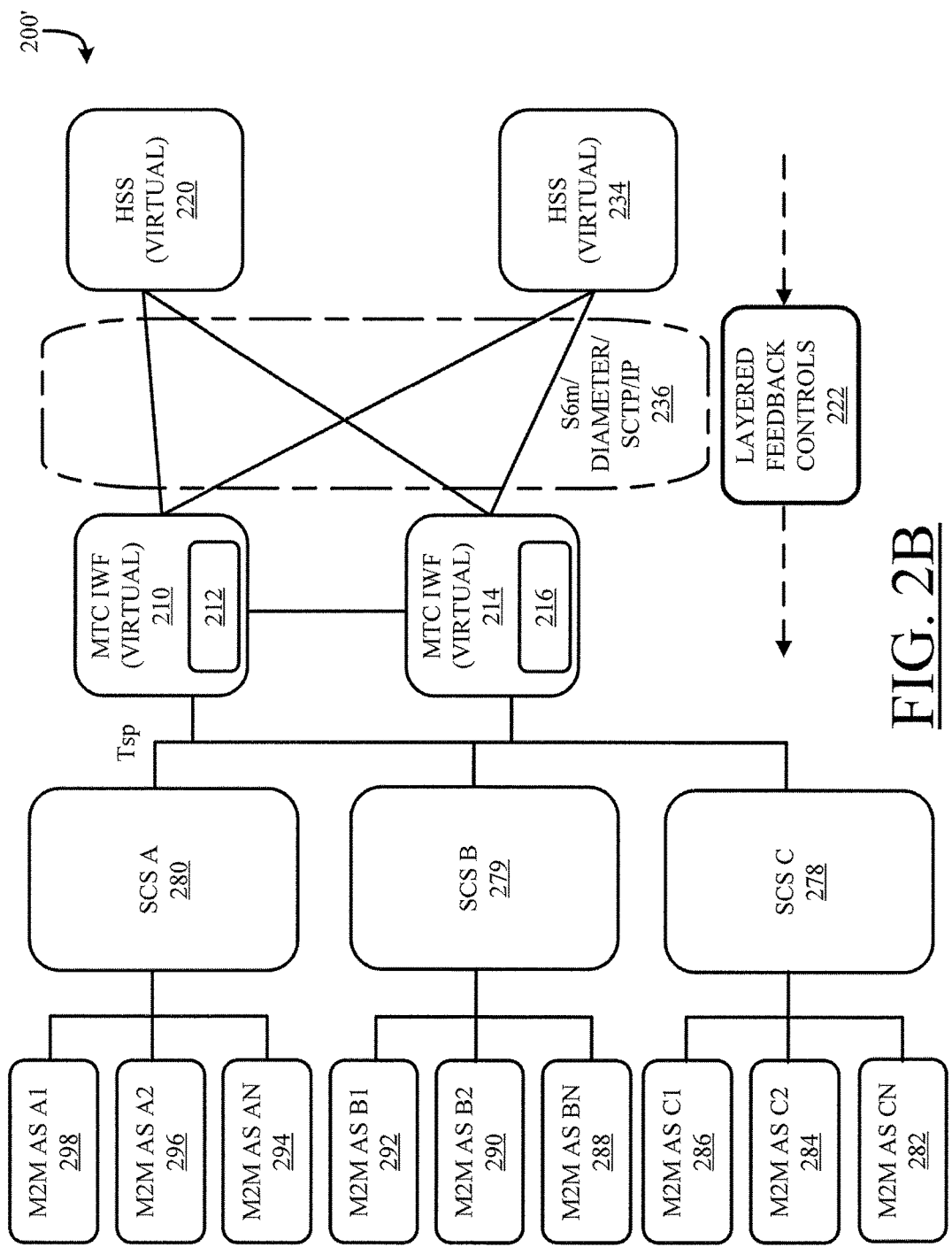
FIG. 2B illustrates another block diagram of an example network employing aspects of the disclosure herein.
Figure 2C:
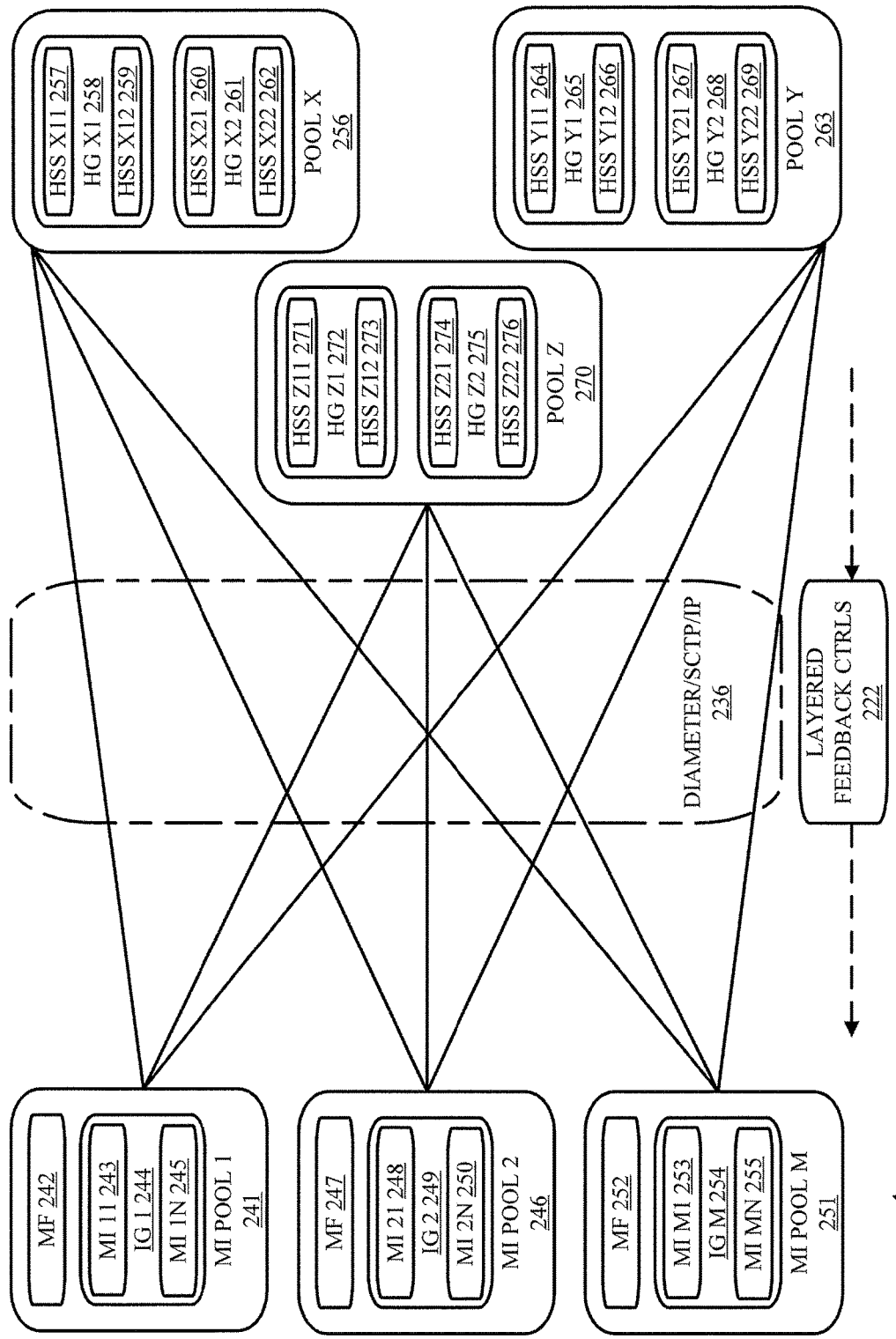
FIG. 2C illustrates a further block diagram of an example network employing aspects of the disclosure herein.

In this regard, FIGS. 2A to 2C illustrate additional embodiments of networks 200, 200', and 200" having multiple ASs, SCSs, MTC-IWFs, and/or HSSs. While network elements of FIGS. 2A to 2C are shown with like element numbering, it is understood that element numbers may refer to a type or class of network element, and that single number may represent multiple instances or variations of elements within the type or class. For example, in FIG. 2C, pools or groups of MTC-IWFs and/or HSSs can be employed in a mesh topology.

Throughout FIGS. 2A to 2C, various interfaces (e.g., diameter interfaces) are indicated along communication lines. However, while shown as such to illustrate one possible embodiment, these should not be construed as limiting, as other interfaces or communication means can be utilized herewith without departing from the scope or spirit of the innovation.

With specific regard to FIG. 2A, an embodiment with multiple application servers corresponding to multiple UE devices interacting with associated applications is illustrated. M2M AS A1 298, M2M AS A2 296, and M2M AS AN 294 represent application servers 1 to N for application A. Similarly, M2M AS B1 292, M2M AS B2 290, and M2M AS BN 288 represent application servers 1 to N for application B, and M2M AS C1 286, M2M AS C2 284, and M2M AS CN 282 represent application servers 1 to N for application C. MTC UE A 228 can interact with application A, MTC UE B 230 with application B, and MTC UE C 232 with application C, via network 200 as connected through RAN 226. M2M AS A1 298, M2M AS A2 296, and M2M AS AN 294 connect to network 200 using SCS A 280, M2M AS B1 292, while M2M AS B2 290, and M2M AS BN 288 connect through SCS B 278, and M2M AS C1 286, M2M AS C2 284, and M2M AS CN 282 connect through SCS C 276.

SCS A 280, SCS B 278, and SCS C 276 (and/or any other SCSs associated with additional ASs) are communicatively coupled with MTC-IWF 210 including mapping function 212. MTC-IWF 210 is also coupled with HSS 220, which may be a virtualized instance of a HSS. Both MTC-IWF 210 and HSS 220 can be coupled with feedback controls 222. MTC-IWF 210 is also communicatively coupled with the carrier network core or regional network, e.g., MME/SGSN/message service center (MSC) 224, which communicates to UE via RAN 226.

FIG. 2B illustrates a further embodiment of network 200'. While several elements are similar, network 200' includes two MTC-IWFS, MTC-IWF 210 having mapping function 212 and MTC-IWF 214 having mapping function 216. These communicate with an HSS pair comprised of HSS 220 and HSS 234, where layered feedback controls 222 pass feedback from HSS 220 and/or HSS 234 to MTC-IWF 210 and/or MTC-IWF 214. FEEDBACK CONTROLS CAN PROTECT AGAINST OL OVERLOAD FIG. 2C illustrates yet a further embodiment of network 220" having resource pools. Specifically, network 220" includes the generalized block diagram illustrated having a mesh of MTC-IWFs interacting with HSSs for load sharing. The pools can be arranged based on, e.g., geography or other parameters to allow organization of different service portions.

Particularly, the portions of network 220" illustrated show MTC-IWF pools 1 to M. MTC-IWF Pool 1 241 includes mapping function 242, as well as MTC-IWF group 1 244 including two or more MTC-IWF instances including MTC-IWF 11 243 and MTC-IWF 1N 245. MTC-IWF Pool 2 246 includes mapping function 247, as well as MTC-IWF group 2 249 including two or more MTC-IWF instances including MTC-IWF 21 248 and MTC-IWF 2N 250. MTC-IWF Pool M 251 includes mapping function 252, as well as MTC-IWF group M 254 including two or more MTC-IWF instances including MTC-IWF M1 253 and MTC-IWF MN 255. While the MTC-IWF pools are shown as including a single group of 1 to M MTC-IWFs, different numbers, or two or more groups of MTC-IWFs can be included in pools. Further, while three pools are illustrated in the MTC-IWF mesh, different numbers of pools can be included without departed from the scope or spirit of the innovation.

The MTC-IWF pools communicate across interfaces to HSS pools to extract subscriber information supporting routing and mapping of requests originating at UE or interacting ASs. Particularly, three HSS pools—HSS pool X 256, HSS pool Y 263, and HSS pool Z 270 are illustrated. HSS pool X 256 includes two HSS pairs, HSS group X1 258 including HSS X11 257 and HSS X12 259, and HSS group X2 261 including HSS X21 260 and HSS X22 262. HSS pool Y 263 includes two HSS pairs, HSS group Y1 265 including HSS Y11 264 and HSS Y12 266, and HSS group Y2 268 including HSS Y21 267 and HSS Y22 269. HSS pool Z 270 includes two HSS pairs, HSS group Z1 272 including HSS Z11 271 and HSS Z12 273, and HSS group Z2 275 including HSS Z21 274 and HSS Z22 276. While the HSS pools are shown as including a HSS pairs, different-sized groups can be included in each pool, and different numbers of groups (e.g., more than two pairs, more than two groups) can be included in a pool. Further, while pools X, Y, and Z are illustrated different numbers of pools can be included without departed from the scope or spirit of the innovation.

With these example networks explained, function of aspects of the MTC-IWF can be better described. MTC-IWFs (e.g., 110, 210, 214, illustrated pools) allow varying ASs (156, 298, et cetera) from different industry verticals or contexts to interact with UE (198, 196, 190, 228, et cetera) across mobile networks by ensuring MTC is properly handled according to network-defined functions or protocols. Generally, then, MTC-IWFs provide IoT devices serviceability across data networks.

When an AS originates a trigger or query to UE (e.g., a single device or class/group of devices identified by manufacturer, model, unique external identifier, software, location, users, et cetera) utilizing associated software or functionality, or UE originates a trigger or query to an AS associated with its software or functionality, it must be routed through the network. This may travel through an intermediary element—on the UE side, a RAN (e.g., RAN 226) or on the AS side, an SCS (e.g., 280, 158), and/or other elements in either situation—before arriving at the MTC-IWF which handles and routes the trigger or query.

This handling and routing is facilitated by the mapping function (e.g., 112, 212, 216) of the MTC-IWF. The mapping function maps external identifiers (or other unique IDs such as an international mobile equipment identity) for UE and ASs to facilitate traffic routing and service provisioning.

Static mapping of user subscriptions to external identities associated with application providers/SCSs may not provide comprehensive and rapid routing because virtualized functions associated with services may be dynamically instantiated and de-instantiated (e.g., based on usage, based on sessions, to share resources). Therefore, the mapping function of the MTC-IWF is a dynamic mechanism that maintains information defining virtualized network topology and subscription-to-identity mapping for UE and ASs to facilitate routing decisions by the MTC-IWF for requests from UE or ASs. This can be performed over an interface such as the S6m interface supporting IoT communications to support scalability, service roll-out, dynamic mapping, overload detection, and protection mechanisms.

To this end, the mapping function extracts user subscription information from an associated HSS (e.g., 120, 220, 234, or pools 256, 263, 270) based on an external trigger (e.g., from an AS or UE) and identity mapping. Mappings are updated in real-time to track changes to network topology and configuration. Using these mappings, the MTC-IWF routes requests to a correct serving node and ultimately the intended target. Dynamic closed-loop feedback controls between the MTC-IWF and HSS along with the mapping function facilitate re-routing of particular interface traffic (e.g., on S6m) to/from an MTC-IWF based on specific triggers from pairs of ASs and SCSs to alternate HSS and MME systems, maintaining the virtualized network topology mapping.

The mapping function or other modules of the MTC-IWF can also track individual requests by associating requests (e.g., triggers, queries) with a request reference number and the request state in terms of completion or status. This can allow requests to be timed out, cancelled, recalled, dropped, superseded, et cetera, depending on the activity of network elements and users.

The mapping function can also maintain state information related to various network elements or interfaces. For example, the mapping function can determine or handle load factors to provide information to feedback mechanisms used by the MTC-IWF for routing and traffic management. Load factors can be monitored continuously, based on conditions, or at periodic intervals.

The mapping function can also work with legacy systems or updated versions thereof. For example, interacting with a SMSC, the mapping function may determine routing, through the MTC-IWF, to deliver a short message service (SMS) message to a device on a carrier different from that of the message-originating UE.

Figure 3:
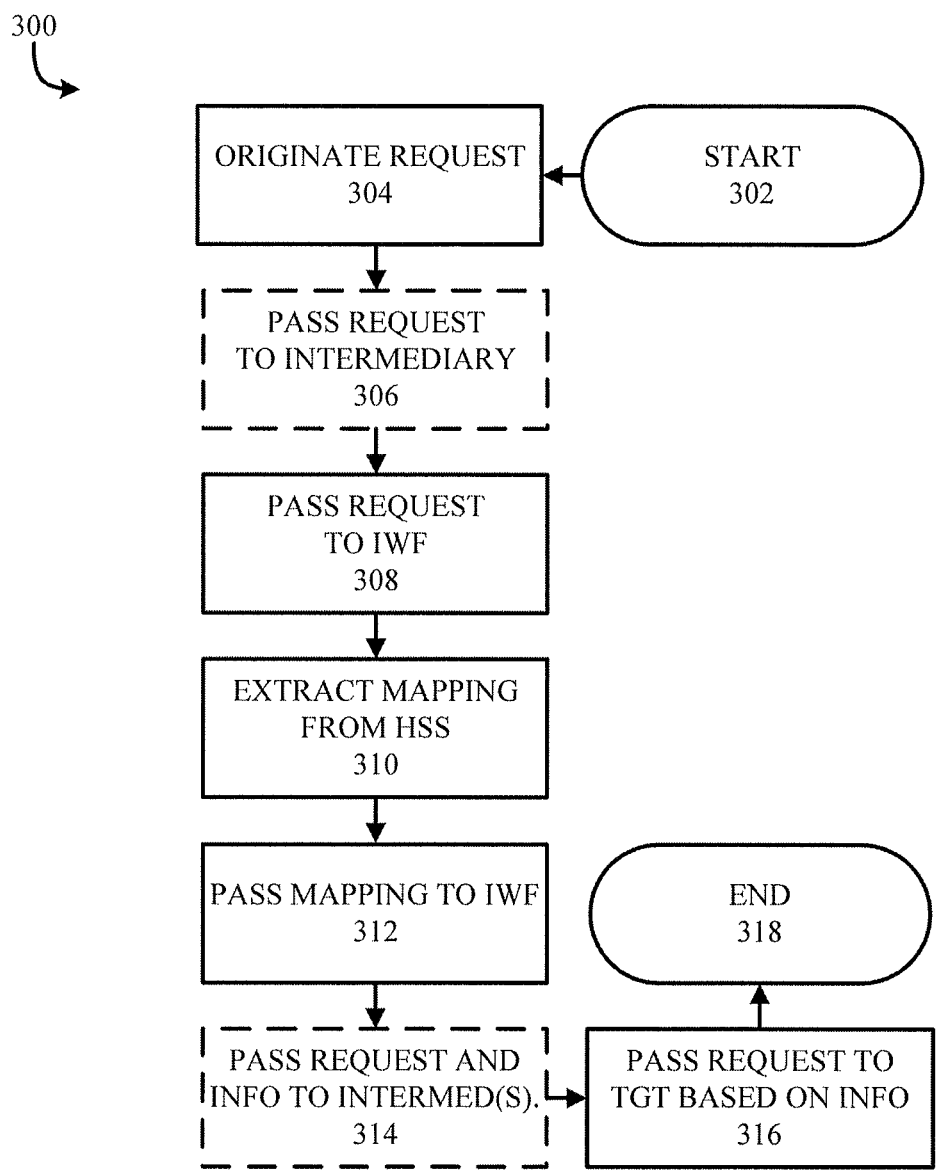
FIG. 3 illustrates an example methodology depicting aspects disclosed herein.

FIG. 3 illustrates a flow chart of an example methodology 300 capturing these aspects. Methodology 300 begins at 302 and proceeds to 304 where a request is generated. The request may be generated by an application server triggering or querying user equipment (a single device or group), by user equipment seeking to trigger or query an application server (or other user equipment), or at other points within the network.

Methodology 300 may thereafter, in embodiments, proceed to 304 where an intermediary element or multiple intermediary elements communicatively coupled with the originating element can receive and transmit the request. If the AS originates the request, the request may be passed to, e.g., an SCS associated with the AS. If UE originates the request, the request may be passed to, e.g., a RAN or access point, and thereafter a MME or SGSN.

At 308, the request is passed to an MTC-IWF. The MTC-IWF handles management of the request by performing any necessary translation, interpretation, conversion, et cetera, of the request to ensure it conforms with network-defined functions or other standards of the network. In embodiments, the request can be provided in a format not requiring such processing, or may be processed before reaching the MTC-IWF.

A mapping function of the MTC-IWF generates and/or maintains a mapping of network topology including unique identifiers for ASs and UE. The MTC-IWF possesses knowledge of the serving HSS in multiple-HSS embodiments, and information for the mapping can be extracted from the HSS. The mapping includes subscription information, sourced from an HSS, to track application provisioning, authentication, et cetera. The mapping can also include load data and other metrics.

Thereafter, at 312, mapping data related to the request is provided through the MTC-IWF. This mapping data includes target information (e.g., receiving UE or AS) and serving node information for reaching the target. With this mapping data, the MTC-IWF determines routing for the request and proceeds with routing the request according to the determination.

In some embodiments, the request and associated information determined by the MTC-IWF can be passed through intermediary elements en-route to its target. In examples where an AS request is being directed to UE, the MTC-IWF may pass the information to a MME and/or RAN. In examples where a UE request is being directed to an AS, the MTC-IWF may pass the information to an SCS. Thereafter, the request is passed to the target at 316, and methodology 300 can end at 318.

Various alternative or complementary embodiments can be utilized in conjunction with the illustrated figures. In embodiments, the HSS can also be used for authenticating ASs, UE, and/or triggers therefrom.

In embodiments, particularly including a large volume of UE belonging to a mapped sub-group within a group or across multiple sets of groups to be triggered with subscriber requests (e.g., from a service provider), the serving AS and SCS nodes can interact with the MTC-IWF on a pre-defined mapping or via intelligent learning. To avoid overloads from wide-ranging requests, one or more HSSs can include stand-alone overload controls based on internal resource (e.g., processor, memory, interface utilization) evaluation. The overload controls can include functionality to report back to the MTC-IWF to reduce traffic over the impacted interface. The HSS may send such overload reports based on a static configuration and in response to requests from the MTC-IWF in embodiments where the HS S only interacts with the MTC-IWF through responses to queries from the MTC-IWF. The HSS can further monitor other active interfaces during overload for prioritization and message shedding but may still be unable to resolve particular issues (e.g., if it cannot validate cross-layered (application/diameter/SCTP-transport) monitoring, detection and protection on each of the interfaces in a coordinated manner interworking with the peer nodes. This can be resolved through implementation of an integrated closed-loop dynamic feedback control system and cross-layered protocol monitoring.

In particular, through monitoring the interface (e.g., S6m) utilization on the HSS across operational peer MTC-IWF nodes, in conjunction with its internal resource monitoring (e.g., at time intervals, which can be shorter than other monitoring intervals; and/or on condition) and creating a dynamic mapping configuration of cross-layered protocol resources within the node, detection of impending overload triggers and utilization of appropriate protection schemes so as to mitigate adverse node, peer-node functional and end-to-end service impacts can be implemented.

An HSS ingress can protect itself intelligently by requesting re-routing of the device trigger information from the serving MTC-IWF to an alternate HSS or group of HSS nodes that are in close proximity determined via round trip time (RTT) latency evaluation. The MTC-IWF may utilize the overload reports from an HSS egress to re-route any new AS-SCS based device triggers to alternate HSS systems, apply back-off algorithms (e.g., a random back-off algorithm) based on the priority of the incoming requests so as to avoid saturating the HSS, start internal message prioritization and shedding of low priority requests for a certain group of devices based on their device type, service criticality and its usage, or take other action, et cetera.

Using a closed-loop monitoring system, the HSS can provide dynamic feedback controls to each of its MTC-IWF diameter peer nodes at regular intervals during the diameter transactions exchange so that each of the MTC-IWFs can apply internal diameter message rate throttling mechanisms based on their specific system attributes and constrain aggregate outbound diameter traffic flow and per-diameter interface traffic flow to volumes avoiding saturation internally and toward any peer HSS. The techniques above and elsewhere herein can generally be characterized as mitigating overload conditions or other network issues.

In an embodiment, after the MTC-IWF obtains a serving node identity for a given M2M device (e.g., UE), the MTC-IWF can trigger a control plane request, via interfaces such as T5 (T5a/T5b/T5c) diameter interfaces, towards a respective core network node based on the radio access type in which the device is camped. During mobility scenarios, if the M2M device changes location, the MTC-IWF could select the current serving node based on dynamic methods (e.g., DNS-based selection) or could use an alternate mapping means.

With particular focus on the mapping function, the MTC-IWF mapping function can build, in real-time, an integrated view of the external AS identity to UE (e.g., international mobile subscriber identity and/or IMEI). If the UE supports multiple applications (each of which are characterized by a unique identity from a unique application server or group of application servers) the MTC-IWF extracts the identity from the virtualized HSS and updates its mapping table.

The serving node is extracted (e.g., MME in case of LTE radio access technology) from the HSS and the mapping table is updated with the serving node. Thereafter analysis of the mapping table is performed to route the trigger, accounting for other systemic attributes such as its peer node traffic utilization, proximity, routing complexity, transport latency, et cetera. After the serving MME node receives the device trigger, it can initiate a connection towards the end user (IoT device) based on its internal mapping function that has the serving cell information. Similar techniques are used in UE to AS communication.

As multiple virtual instances of core network functions are created in data centers, the dynamic mapping function within the MTC-IWF can maintain the identity mapping (external application to user subscription) as well as the downstream network topology mapping, using a synthesized version of this mapping to be able for routing device trigger requests.

In embodiments, the mapping function within the MTC-IWF can also be integrated with a RAN database function that has access to the list of LTE RAN nodes associated with a tracking area (and/or multiple tracking areas). Based on this information of the edge serving RAN nodes and geographic distribution, the mapping function can further proactively analyze the target device real-time location information received from the HSS via, e.g., an S6m interface to deliver and/or back-off in case of particular conditions (e.g., an emergency) in that area.

In embodiments, the mapping function and/or MTC-IWF can be used to enforce priority or quality of service requirements. In alternative or complementary embodiments, analytics based on activity performed by the MTC-IWF or associated mapping function, or data collected thereby, can be reported and/or interpreted for monetization.

FIGS. 4-9 show a variety of aspects used in conjunction with or providing context for M2M communication and the MTC IWF. Particularly, FIG. 4 describes virtualization in the context of instances described above, and FIGS. 5-9 show various computing and network environments with which aspects herein are compatible.

Figure 4:
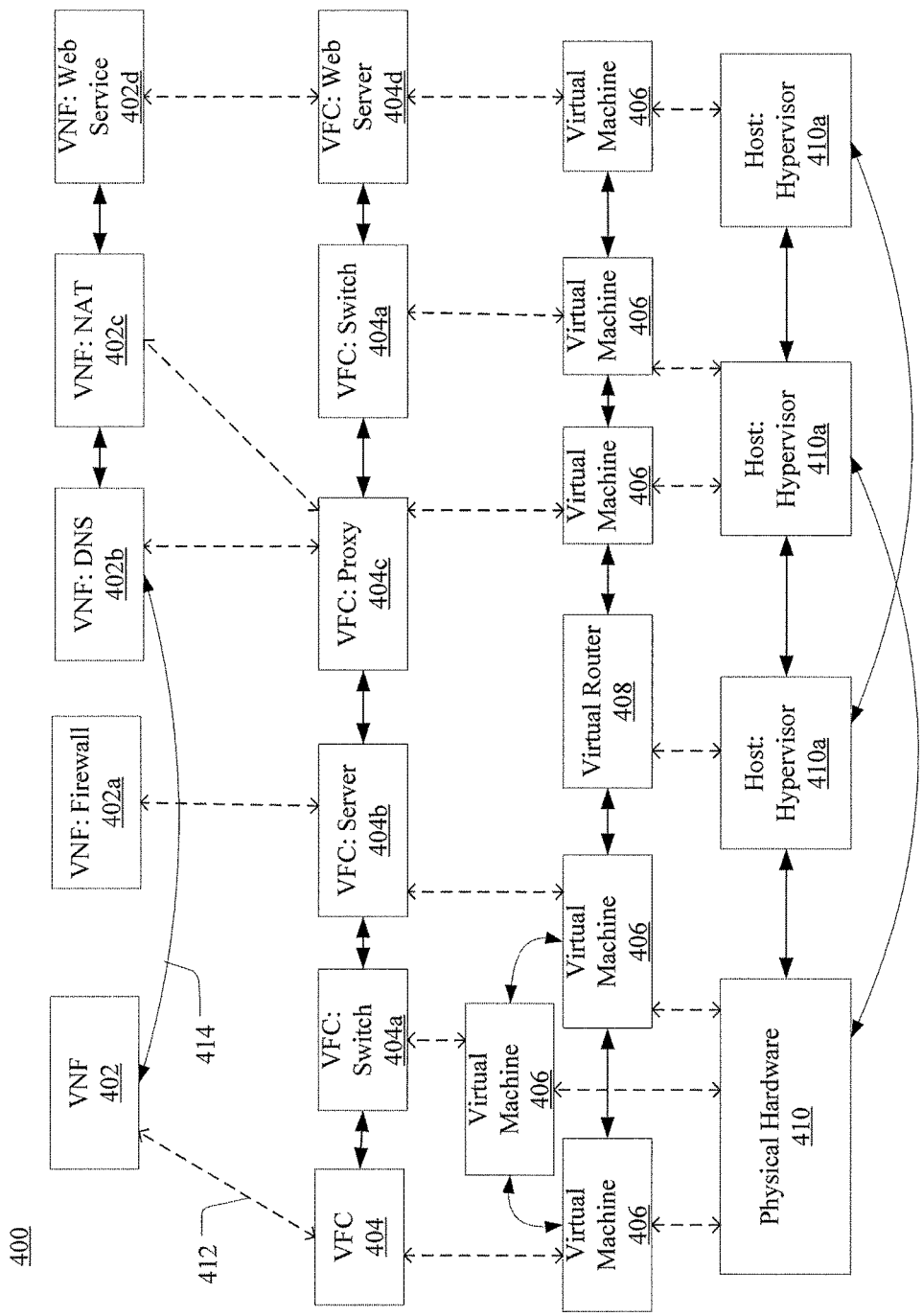
FIG. 4 is a representation of an example network including virtualization.

FIG. 4 is a representation of an example network 400. Network 400 may comprise an SDN—that is, network 400 may include one or more virtualized functions implemented on general purpose hardware, such as in lieu of having dedicated hardware for every network function. That is, general purpose hardware of network 400 may be configured to run virtual network elements to support communication services, such as mobility services, including consumer services and enterprise services. These services may be provided or measured in sessions.

A virtual network functions (VNFs) 402 may be able to support a limited number of sessions. Each VNF 402 may have a VNF type that indicates its functionality or role. For example, FIG. 4 illustrates a gateway VNF 402a and a policy and charging rules function (PCRF) VNF 402b. Additionally or alternatively, VNFs 402 may include other types of VNFs. Each VNF 402 may use one or more virtual machines (VMs) 404 to operate. Each VM 404 may have a VM type that indicates its functionality or role. For example, FIG. 4 illustrates a MCM VM 404a, an ASM VM 404b, and a DEP VM 404c. Additionally or alternatively, VMs 404 may include other types of VMs. Each VM 404 may consume various network resources from a hardware platform 406, such as a resource 408, a virtual central processing unit (vCPU) 408a, memory 408b, or a network interface card (NIC) 408c. Additionally or alternatively, hardware platform 406 may include other types of resources 408.

While FIG. 4 illustrates resources 408 as collectively contained in hardware platform 406, the configuration of hardware platform 406 may isolate, for example, certain memory from other memory 108c.

Hardware platform 406 may comprise one or more chasses 410. Chassis 410 may refer to the physical housing or platform for multiple servers or other network equipment. In an aspect, chassis 410 may also refer to the underlying network equipment. Chassis 410 may include one or more servers 412. Server 412 may comprise general purpose computer hardware or a computer. In an aspect, chassis 410 may comprise a metal rack, and servers 412 of chassis 410 may comprise blade servers that are physically mounted in or on chassis 410.

Each server 412 may include one or more network resources 408, as illustrated. Servers 412 may be communicatively coupled together (not shown) in any combination or arrangement. For example, all servers 412 within a given chassis 410 may be communicatively coupled. As another example, servers 412 in different chasses 410 may be communicatively coupled. Additionally or alternatively, chasses 410 may be communicatively coupled together (not shown) in any combination or arrangement.

The characteristics of each chassis 410 and each server 412 may differ. The type or number of resources 410 within each server 412 may vary. In an aspect, chassis 410 may be used to group servers 412 with the same resource characteristics. In another aspect, servers 412 within the same chassis 410 may have different resource characteristics.

Given hardware platform 406, the number of sessions that may be instantiated may vary depending upon how efficiently resources 408 are assigned to different VMs 404. For example, assignment of VMs 404 to particular resources 408 may be constrained by one or more rules. For example, a first rule may require that resources 408 assigned to a particular VM 404 be on the same server 412 or set of servers 412. For example, if VM 404 uses eight vCPUs 408a, 1 GB of memory 408b, and 2 NICs 408c, the rules may require that all of these resources 408 be sourced from the same server 412. Additionally or alternatively, VM 404 may require splitting resources 408 among multiple servers 412, but such splitting may need to conform with certain restrictions. For example, resources 408 for VM 404 may be able to be split between two servers 412. Default rules may apply. For example, a default rule may require that all resources 408 for a given VM 404 must come from the same server 412.

An affinity rule may restrict assignment of resources 408 for a particular VM 404 (or a particular type of VM 404). For example, an affinity rule may require that certain VMs 404 be instantiated on (that is, consume resources from) the same server 412 or chassis 410. For example, if VNF 402 uses six MCM VMs 404a, an affinity rule may dictate that those six MCM VMs 404a be instantiated on the same server 412 (or chassis 410). As another example, if VNF 402 uses MCM VMs 404a, ASM VMs 404b, and a third type of VMs 404, an affinity rule may dictate that at least the MCM VMs 404a and the ASM VMs 404b be instantiated on the same server 412 (or chassis 410). Affinity rules may restrict assignment of resources 408 based on the identity or type of resource 408, VNF 402, VM 404, chassis 410, server 412, or any combination thereof.

An anti-affinity rule may restrict assignment of resources 408 for a particular VM 404 (or a particular type of VM 404). In contrast to an affinity rule which may require that certain VMs 404 be instantiated on the same server 412 or chassis 410 an anti-affinity rule requires that certain VMs 404 be instantiated on different servers 412 (or different chasses 410). For example, an anti-affinity rule may require that MCM VM 404a be instantiated on a particular server 412 that does not contain any ASM VMs 404b. As another example, an anti-affinity rule may require that MCM VMs 404a for a first VNF 402 be instantiated on a different server 412 (or chassis 410) than MCM VMs 404a for a second VNF 402. Anti-affinity rules may restrict assignment of resources 408 based on the identity or type of resource 408, VNF 402, VM 404, chassis 410, server 412, or any combination thereof.

Within these constraints, resources 408 of hardware platform 406 may be assigned to be used to instantiate VMs 404, which in turn may be used to instantiate VNFs 402, which in turn may be used to establish sessions. The different combinations for how such resources 408 may be assigned may vary in complexity and efficiency. For example, different assignments may have different limits of the number of sessions that can be established given a particular hardware platform 406.

For example, consider a session that may require gateway VNF 402a and PCRF VNF 402b. Gateway VNF 402a may require five VMs 404 instantiated on the same server 412, and PCRF VNF 402b may require two VMs 404 instantiated on the same server 412. (In embodiments no affinity or anti-affinity rules restrict whether VMs 404 for PCRF VNF 402b may or must be instantiated on the same or different server 412 than VMs 404 for gateway VNF 402a.) In this example, each of two servers 412 may have sufficient resources 408 to support 10 VMs 404. To implement sessions using these two servers 412, first server 412 may be instantiated with 10 VMs 404 to support two instantiations of gateway VNF 402a, and second server 412 may be instantiated with 9 VMs: five VMs 404 to support one instantiation of gateway VNF 402a and four VMs 404 to support two instantiations of PCRF VNF 402b. This may leave the remaining resources 408 that could have supported the tenth VM 404 on second server 412 unused (and unusable for an instantiation of either a gateway VNF 402a or a PCRF VNF 402b). Alternatively, first server 412 may be instantiated with 10 VMs 404 for two instantiations of gateway VNF 402a and second server 412 may be instantiated with 10 VMs 404 for five instantiations of PCRF VNF 402b, using all available resources 408 to maximize the number of VMs 404 instantiated.

Consider, further, how many sessions each gateway VNF 402a and each PCRF VNF 402b may support. This may factor into which assignment of resources 408 is more efficient. For example, consider if each gateway VNF 402a supports two million sessions, and if each PCRF VNF 402b supports three million sessions. For the first configuration—three total gateway VNFs 402a (which satisfy the gateway requirement for six million sessions) and two total PCRF VNFs 402b (which satisfy the PCRF requirement for six million sessions)—would support a total of six million sessions. For the second configuration—two total gateway VNFs 402a (which satisfy the gateway requirement for four million sessions) and five total PCRF VNFs 402b (which satisfy the PCRF requirement for 15 million sessions)—would support a total of four million sessions. Thus, while the first configuration may seem less efficient looking only at the number of available resources 408 used (as resources 408 for the tenth possible VM 404 are unused), the second configuration is actually more efficient from the perspective of being the configuration that can support more the greater number of sessions.

To solve the problem of determining a capacity (or, number of sessions) that can be supported by a given hardware platform 405, a given requirement for VNFs 402 to support a session, a capacity for the number of sessions each VNF 402 (e.g., of a certain type) can support, a given requirement for VMs 404 for each VNF 402 (e.g., of a certain type), a give requirement for resources 408 to support each VM 404 (e.g., of a certain type), rules dictating the assignment of resources 408 to one or more VMs 404 (e.g., affinity and anti-affinity rules), the chasses 410 and servers 412 of hardware platform 406, and the individual resources 408 of each chassis 410 or server 412 (e.g., of a certain type), an integer programming problem may be formulated.

First, a plurality of index sets may be established. For example, index set L may include the set of chasses 410. For example, if a system allows up to 6 chasses 410, this set may be:

L={1, 2, 3, 4, 5, 6}, where l is an element of L.

Another index set J may include the set of servers 412. For example, if a system allows up to 16 servers 412 per chassis 410, this set may be:

J={1, 2, 3, . . . , 16}, where j is an element of J.

As another example, index set K having at least one element k may include the set of VNFs 402 that may be considered. For example, this index set may include all types of VNFs 402 that may be used to instantiate a service. For example, let

K={GW, PCRF} where GW represents gateway VNFs 402a and PCRF represents PCRF VNFs 402b.

Another index set I(k) may equal the set of VMs 404 for a VNF 402 k. Thus, let

I(GW)={MCM, ASM, IOM, WSM, CCM, DCM} represent VMs 404 for gateway VNF 402a, where MCM represents MCM VM 404a, ASM represents ASM VM 404b, and each of IOM, WSM, CCM, and DCM represents a respective type of VM 404. Further, let

I(PCRF)={DEP, DIR, POL, SES, MAN} represent VMs 404 for PCRF VNF 402b, where DEP represents DEP VM 404c and each of DIR, POL, SES, and MAN represent a respective type of VM 404.

Another index set V may include the set of possible instances of a given VM 404. For example, if a system allows up to 20 instances of VMs 404, this set may be:

V={1, 2, 3, . . . , 20}, where v is an element of V.

In addition to the sets, the integer programming problem may include additional data. The characteristics of VNFs 402, VMs 404, chasses 410, or servers 412 may be factored into the problem. This data may be referred to as parameters. For example, for given VNF 402 k, the number of sessions that VNF 402 k can support may be defined as a function S(k). In an aspect, for an element k of set K, this parameter may be represented by $S(k) >= 0$; is a measurement of the number of sessions k can support. Returning to the earlier example where gateway VNF 402a may support 2 million sessions, then this parameter may be S(GW)=2,000,000.

VM 404 modularity may be another parameter in the integer programming problem. VM 404 modularity may represent the VM 404 requirement for a type of VNF 402. For example, for k that is an element of set K and i that is an element of set I, each instance of VNF k may require M(k, i) instances of VMs 404. For example, recall the example where

I(GW)={MCM, ASM, IOM, WSM, CCM, DCM}.

In an example, M(GW, I(GW)) may be the set that indicates the number of each type of VM 404 that may be required to instantiate gateway VNF 402a. For example,

M(GW, I(GW))={2, 16, 4, 4, 2, 4} may indicate that one instantiation of gateway VNF 402a may require two instantiations of MCM VMs 404a, 16 instantiations of ACM VM 404b, four instantiations of TOM VM 404, four instantiations of WSM VM 404, two instantiations of CCM VM 404, and four instantiations of DCM VM 404.

Another parameter may indicate the capacity of hardware platform 406. For example, a parameter C may indicate the number of vCPUs 408a required for each VM 404 type i and for each VNF 402 type k. For example, this may include the parameter C(k, i).

For example, if MCM VM 404a for gateway VNF 402a requires 20 vCPUs 408a, this may be represented as C(GW, MCM)=20.

However, given the complexity of the integer programming problem—the numerous variables and restrictions that must be satisfied—implementing an algorithm that may be used to solve the integer programming problem efficiently, without sacrificing optimality, may be difficult.

Figure 5:
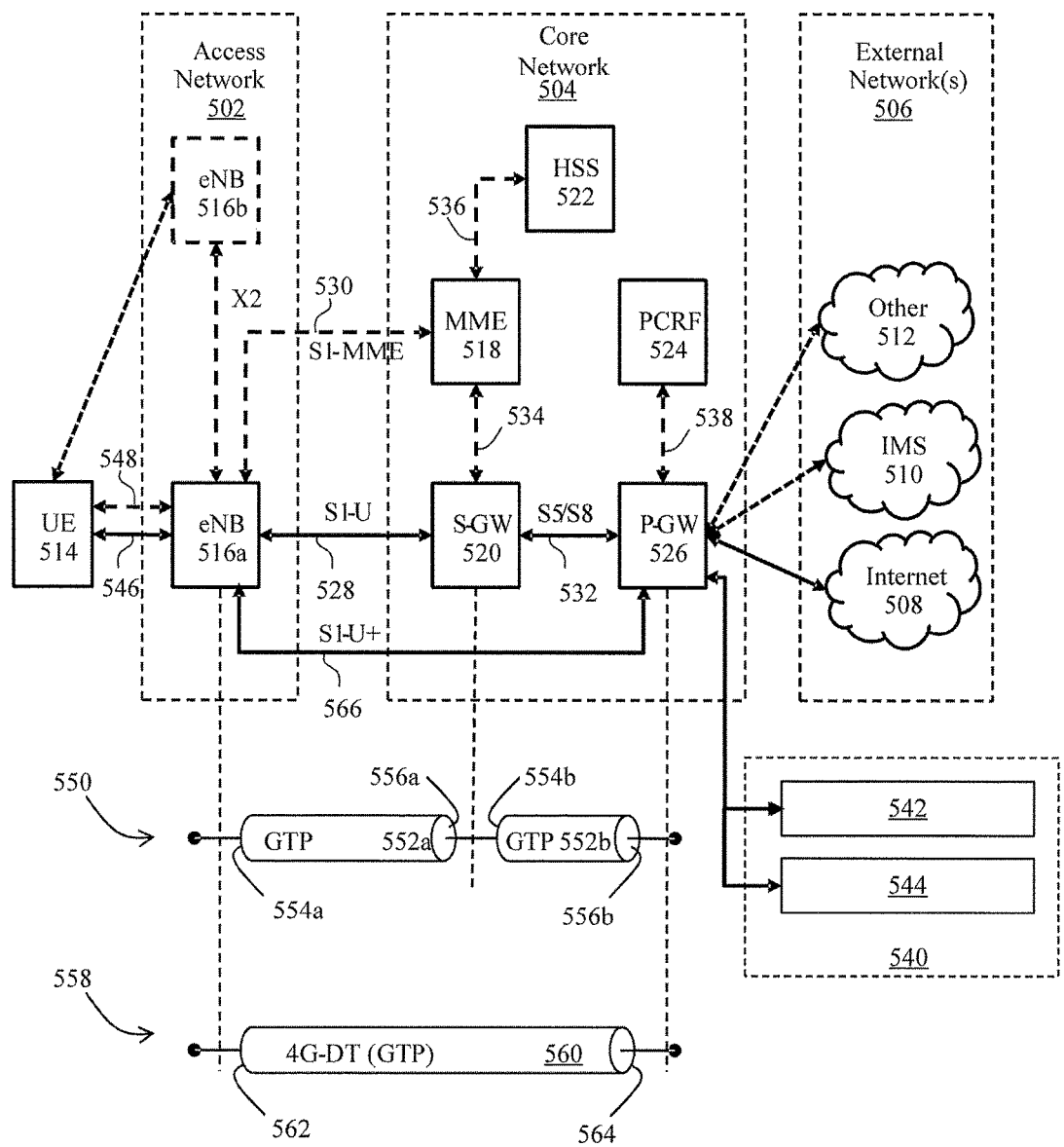
FIG. 5 depicts an example communication system that provides wireless telecommunication services over wireless communication networks.

FIG. 5 illustrates a functional block diagram depicting one example of an LTE-EPS network architecture 500 that may be at least partially implemented as an SDN. Network architecture 500 disclosed herein is referred to as a modified LTE-EPS architecture 500 to distinguish it from a traditional LTE-EPS architecture.

An example modified LTE-EPS architecture 500 is based at least in part on standards developed by the 3rd Generation Partnership Project (3GPP), with information available at www.3gpp.org. LTE-EPS network architecture 500 may include an access network 502, a core network 504, e.g., an EPC or Common Back Bone (CBB) and one or more external networks 506, sometimes referred to as PDN or peer entities. Different external networks 506 can be distinguished from each other by a respective network identifier, e.g., a label according to DNS naming conventions describing an access point to the PDN. Such labels can be referred to as Access Point Names (APN). External networks 506 can include one or more trusted and non-trusted external networks such as an Internet protocol (IP) network 508, an IP multimedia subsystem (IMS) network 510, and other networks 512, such as a service network, a corporate network, or the like. In an aspect, access network 502, core network 504, or external network 506 may include or communicate with a network.

Access network 502 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 502 can include one or more communication devices, commonly referred to as UE 514, and one or more wireless access nodes, or base stations 516a, 516b. During network operations, at least one base station 516 communicates directly with UE 514. Base station 516 can be an evolved Node B (e-NodeB), with which UE 514 communicates over the air and wirelessly. UEs 514 can include, without limitation, wireless devices, e.g., satellite communication systems, portable digital assistants (PDAs), laptop computers, tablet devices and other mobile devices (e.g., cellular telephones, smart appliances, and so on). UEs 514 can connect to eNBs 516 when UE 514 is within range according to a corresponding wireless communication technology.

UE 514 generally runs one or more applications that engage in a transfer of packets between UE 514 and one or more external networks 506. Such packet transfers can include one of downlink packet transfers from external network 506 to UE 514, uplink packet transfers from UE 514 to external network 506 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 504, e.g., according to parameters, such as the QoS.

Core network 504 uses a concept of bearers, e.g., EPS bearers, to route packets, e.g., IP traffic, between a particular gateway in core network 504 and UE 514. A bearer refers generally to an IP packet flow with a defined QoS between the particular gateway and UE 514. Access network 502, e.g., E UTRAN, and core network 504 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 504 includes various network entities, such as MME 518, SGW 520, Home Subscriber Server (HSS) 522, Policy and Charging Rules Function (PCRF) 524 and PGW 526. In one embodiment, MME 518 comprises a control node performing a control signaling between various equipment and devices in access network 502 and core network 504. The protocols running between UE 514 and core network 504 are generally known as Non-Access Stratum (NAS) protocols.

For illustration purposes only, the terms MME 518, SGW 520, HSS 522 and PGW 526, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 520 routes and forwards all user data packets. SGW 520 also acts as a mobility anchor for user plane operation during handovers between base stations, e.g., during a handover from first eNB 516a to second eNB 516b as may be the result of UE 514 moving from one area of coverage, e.g., cell, to another. SGW 520 can also terminate a downlink data path, e.g., from external network 506 to UE 514 in an idle state, and trigger a paging operation when downlink data arrives for UE 514. SGW 520 can also be configured to manage and store a context for UE 514, e.g., including one or more of parameters of the IP bearer service and network internal routing information. In addition, SGW 520 can perform administrative functions, e.g., in a visited network, such as collecting information for charging (e.g., the volume of data sent to or received from the user), and/or replicate user traffic, e.g., to support a lawful interception. SGW 520 also serves as the mobility anchor for interworking with other 3GPP technologies such as universal mobile telecommunication system (UMTS).

At any given time, UE 514 is generally in one of three different states: detached, idle, or active. The detached state is typically a transitory state in which UE 514 is powered on but is engaged in a process of searching and registering with network 502. In the active state, UE 514 is registered with access network 502 and has established a wireless connection, e.g., radio resource control (RRC) connection, with eNB 516. Whether UE 514 is in an active state can depend on the state of a packet data session, and whether there is an active packet data session. In the idle state, UE 514 is generally in a power conservation state in which UE 514 typically does not communicate packets. When UE 514 is idle, SGW 520 can terminate a downlink data path, e.g., from one peer entity 506, and triggers paging of UE 514 when data arrives for UE 514. If UE 514 responds to the page, SGW 520 can forward the IP packet to eNB 516a.

HSS 522 can manage subscription-related information for a user of UE 514. For example, tHSS 522 can store information such as authorization of the user, security requirements for the user, quality of service (QoS) requirements for the user, etc. HSS 522 can also hold information about external networks 506 to which the user can connect, e.g., in the form of an APN of external networks 506. For example, MME 518 can communicate with HSS 522 to determine if UE 514 is authorized to establish a call, e.g., a voice over IP (VoIP) call before the call is established.

PCRF 524 can perform QoS management functions and policy control. PCRF 524 is responsible for policy control decision-making, as well as for controlling the flow-based charging functionalities in a policy control enforcement function (PCEF), which resides in PGW 526. PCRF 524 provides the QoS authorization, e.g., QoS class identifier and bit rates that decide how a certain data flow will be treated in the PCEF and ensures that this is in accordance with the user's subscription profile.

PGW 526 can provide connectivity between the UE 514 and one or more of the external networks 506. In illustrative network architecture 500, PGW 526 can be responsible for IP address allocation for UE 514, as well as one or more of QoS enforcement and flow-based charging, e.g., according to rules from the PCRF 524. PGW 526 is also typically responsible for filtering downlink user IP packets into the different QoS-based bearers. In at least some embodiments, such filtering can be performed based on traffic flow templates. PGW 526 can also perform QoS enforcement, e.g., for guaranteed bit rate bearers. PGW 526 also serves as a mobility anchor for interworking with non-3GPP technologies such as CDMA2000.

Within access network 502 and core network 504 there may be various bearer paths/interfaces, e.g., represented by solid lines 528 and 530. Some of the bearer paths can be referred to by a specific label. For example, solid line 528 can be considered an S1-U bearer and solid line 532 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 504 can include various signaling bearer paths/interfaces, e.g., control plane paths/interfaces represented by dashed lines 530, 534, 536, and 538. Some of the signaling bearer paths may be referred to by a specific label. For example, dashed line 530 can be considered as an S1-MME signaling bearer, dashed line 534 can be considered as an S11 signaling bearer and dashed line 536 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 566. In the illustrative example, the S1-U+ user plane interface extends between the eNB 516a and PGW 526. Notably, S1-U+ path/interface does not include SGW 520, a node that is otherwise instrumental in configuring and/or managing packet forwarding between eNB 516a and one or more external networks 506 by way of PGW 526. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 520, 526 due to excessive handover events.

In some embodiments, PGW 526 is coupled to storage device 540, shown in phantom. Storage device 540 can be integral to one of the network nodes, such as PGW 526, for example, in the form of internal memory and/or disk drive. It is understood that storage device 540 can include registers suitable for storing address values. Alternatively or in addition, storage device 540 can be separate from PGW 526, for example, as an external hard drive, a flash drive, and/or network storage.

Storage device 540 selectively stores one or more values relevant to the forwarding of packet data. For example, storage device 540 can store identities and/or addresses of network entities, such as any of network nodes 518, 520, 522, 524, and 526, eNBs 516 and/or UE 514. In the illustrative example, storage device 540 includes a first storage location 542 and a second storage location 544. First storage location 542 can be dedicated to storing a Currently Used Downlink address value 542. Likewise, second storage location 544 can be dedicated to storing a Default Downlink Forwarding address value 544. PGW 526 can read and/or write values into either of storage locations 542, 544, for example, managing Currently Used Downlink Forwarding address value 452 and Default Downlink Forwarding address value 544 as disclosed herein.

In some embodiments, the Default Downlink Forwarding address for each EPS bearer is the SGW S5-U address for each EPS Bearer. The Currently Used Downlink Forwarding address" for each EPS bearer in PGW 526 can be set every time when PGW 526 receives an uplink packet, e.g., a GTP-U uplink packet, with a new source address for a corresponding EPS bearer. When UE 514 is in an idle state, the "Current Used Downlink Forwarding address" field for each EPS bearer of UE 514 can be set to a "null" or other suitable value.

In some embodiments, the Default Downlink Forwarding address is only updated when PGW 526 receives a new SGW S5-U address in a predetermined message or messages. For example, the Default Downlink Forwarding address is only updated when PGW 526 receives one of a Create Session Request, Modify Bearer Request and Create Bearer Response messages from SGW 520.

As values 542, 544 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 502 and core network 504 are illustrated in a simplified block diagram in FIG. 5. In other words, either or both of access network 502 and the core network 504 can include additional network elements that are not shown, such as various routers, switches and controllers. In addition, although FIG. 5 illustrates only a single one of each of the various network elements, it should be noted that access network 502 and core network 504 can include any number of the various network elements. For example, core network 504 can include a pool (i.e., more than one) of MMEs 518, SGWs 520 or PGWs 526.

In the illustrative example, data traversing a network path between UE 514, eNB 516a, SGW 520, PGW 526 and external network 506 may be considered to constitute data transferred according to an end-to-end IP service. However, for the present disclosure, to properly perform establishment management in LTE-EPS network architecture 500, the core network, data bearer portion of the end-to-end IP service is analyzed.

An establishment may be defined herein as a connection set up request between any two elements within LTE-EPS network architecture 500. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 546) between UE 514 and eNB 516a, a second portion (e.g., an S1 data bearer 528) between eNB 516a and SGW 520, and a third portion (e.g., an S5/S8 bearer 532) between SGW 520 and PGW 526. Various signaling bearer portions are also illustrated in FIG. 5. For example, a first signaling portion (e.g., a signaling radio bearer 548) between UE 514 and eNB 516a, and a second signaling portion (e.g., S1 signaling bearer 530) between eNB 516a and MME 518.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of a network, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 550 includes a first tunnel 552a between two tunnel endpoints 554a and 556a, and a second tunnel 552b between two tunnel endpoints 554b and 556b. In the illustrative example, first tunnel 552a is established between eNB 516a and SGW 520. Accordingly, first tunnel 552a includes a first tunnel endpoint 554a corresponding to an S1-U address of eNB 516a (referred to herein as the eNB S1-U address), and second tunnel endpoint 556a corresponding to an S1-U address of SGW 520 (referred to herein as the SGW S1-U address). Likewise, second tunnel 552b includes first tunnel endpoint 554b corresponding to an S5-U address of SGW 520 (referred to herein as the SGW S5-U address), and second tunnel endpoint 556b corresponding to an S5-U address of PGW 526 (referred to herein as the PGW S5-U address).

In at least some embodiments, first tunnel solution 550 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 558 includes a single or direct tunnel 560 between tunnel endpoints 562 and 564. In the illustrative example, direct tunnel 560 is established between eNB 516a and PGW 526, without subjecting packet transfers to processing related to SGW 520. Accordingly, direct tunnel 560 includes first tunnel endpoint 562 corresponding to the eNB S1-U address, and second tunnel endpoint 564 corresponding to the PGW S5-U address. Packet data received at either end can be encapsulated into a payload and directed to the corresponding address of the other end of the tunnel. Such direct tunneling avoids processing, e.g., by SGW 520 that would otherwise relay packets between the same two endpoints, e.g., according to a protocol, such as the GTP-U protocol.

In some scenarios, direct tunneling solution 558 can forward user plane data packets between eNB 516a and PGW 526, by way of SGW 520. That is, SGW 520 can serve a relay function, by relaying packets between two tunnel endpoints 516a, 526. In other scenarios, direct tunneling solution 558 can forward user data packets between eNB 516a and PGW 526, by way of the S1 U+ interface, thereby bypassing SGW 520.

Generally, UE 514 can have one or more bearers at any one time. The number and types of bearers can depend on applications, default requirements, and so on. It is understood that the techniques disclosed herein, including the configuration, management and use of various tunnel solutions 550, 558, can be applied to the bearers on an individual bases. That is, if user data packets of one bearer, say a bearer associated with a VoIP service of UE 514, then the forwarding of all packets of that bearer are handled in a similar manner. Continuing with this example, the same UE 514 can have another bearer associated with it through the same eNB 516a. This other bearer, for example, can be associated with a relatively low rate data session forwarding user data packets through core network 504 simultaneously with the first bearer. Likewise, the user data packets of the other bearer are also handled in a similar manner, without necessarily following a forwarding path or solution of the first bearer. Thus, one of the bearers may be forwarded through direct tunnel 558; whereas, another one of the bearers may be forwarded through a two-tunnel solution 550.

Figure 6:
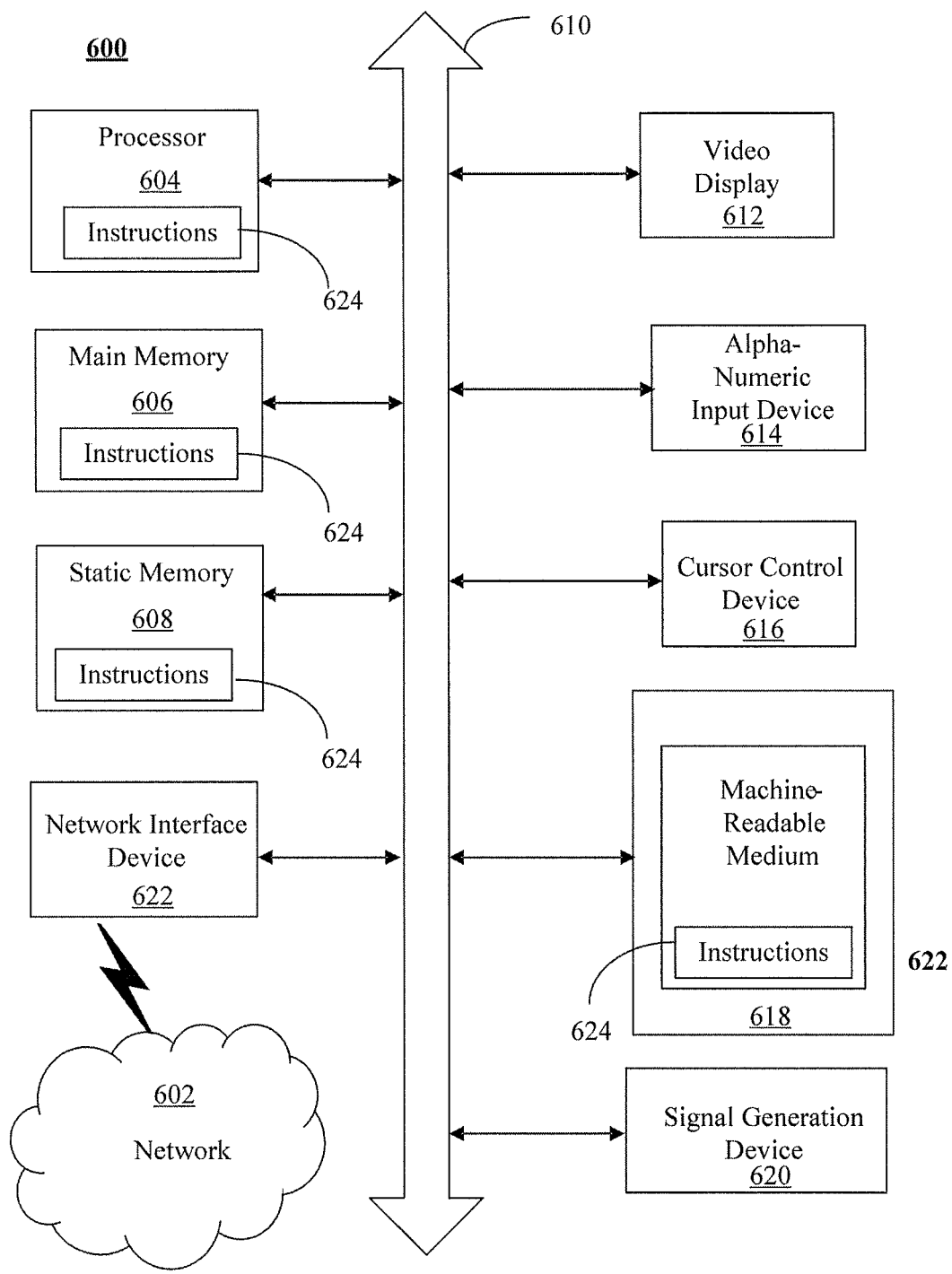
FIG. 6 depicts an example communication system that provides wireless telecommunication services over wireless communication networks.

FIG. 6 depicts an example diagrammatic representation of a machine in the form of a computer system 600 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices described herein. In some embodiments, the machine may be connected (e.g., using a network 602) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 600 may include a processor (or controller) 604 (e.g., a central processing unit (CPU)), a graphics processing unit (GPU, or both), a main memory 606 and a static memory 608, which communicate with each other via a bus 610. The computer system 600 may further include a display unit 612 (e.g., a liquid crystal display (LCD), a flat panel, or a solid state display). Computer system 600 may include an input device 614 (e.g., a keyboard), a cursor control device 616 (e.g., a mouse), a disk drive unit 618, a signal generation device 620 (e.g., a speaker or remote control) and a network interface device 622. In distributed environments, the embodiments described in the subject disclosure can be adapted to utilize multiple display units 612 controlled by two or more computer systems 600. In this configuration, presentations described by the subject disclosure may in part be shown in a first of display units 612, while the remaining portion is presented in a second of display units 612.

The disk drive unit 618 may include a tangible computer-readable storage medium 624 on which is stored one or more sets of instructions (e.g., software 626) embodying any one or more of the methods or functions described herein, including those methods illustrated above. Instructions 626 may also reside, completely or at least partially, within main memory 606, static memory 608, or within processor 604 during execution thereof by the computer system 600. Main memory 606 and processor 604 also may constitute tangible computer-readable storage media.

Figure 7:
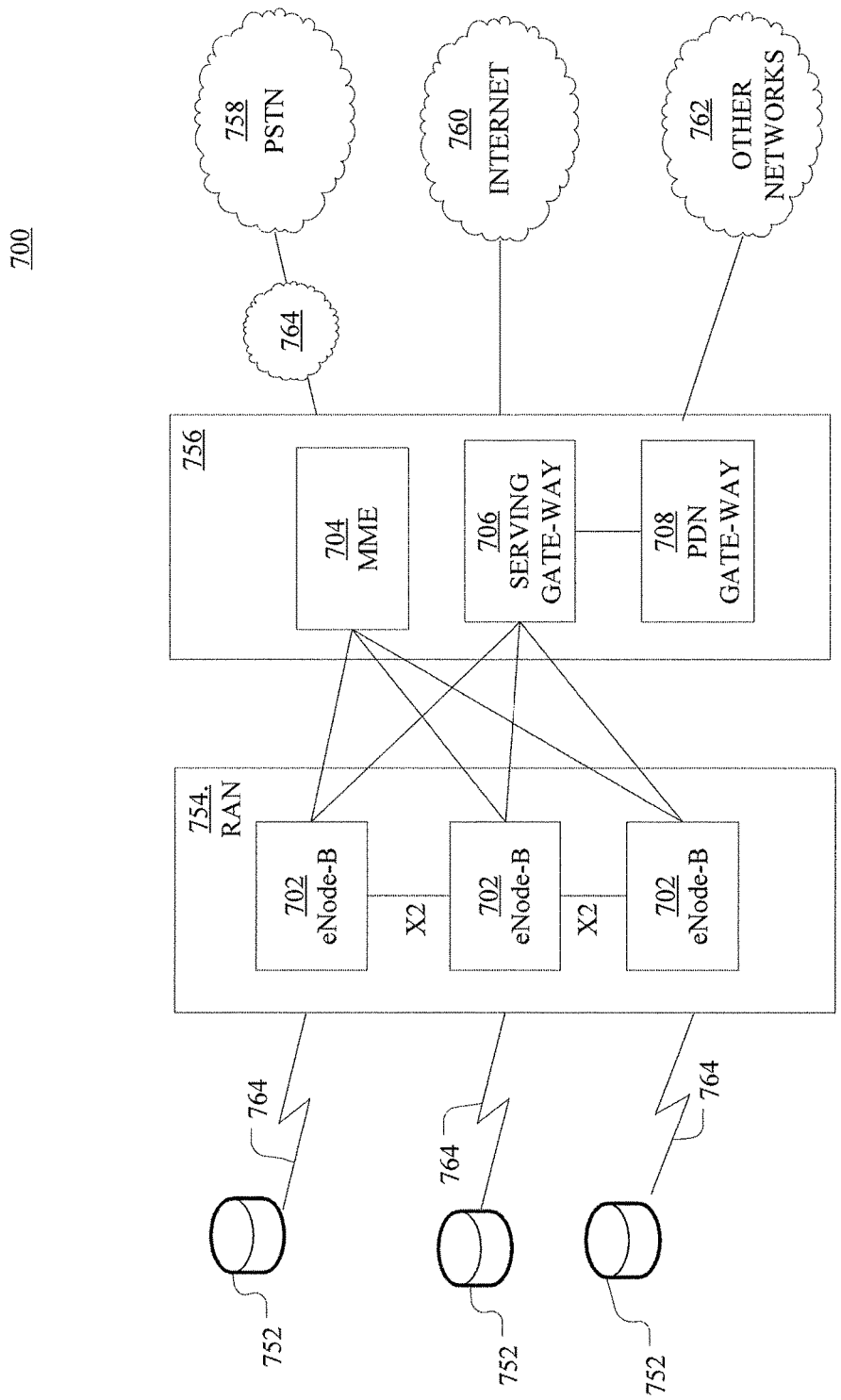
FIG. 7 is an example system diagram of a radio access network and a core network.

FIG. 7 is an example system 700 including RAN 754 and core network 756. As noted above, RAN 754 may employ an E-UTRA radio technology to communicate with WTRUs 752 over air interface 764. RAN 754 may also be in communication with core network 756.

RAN 754 may include any number of eNode-Bs 702 while remaining consistent with the disclosed technology. One or more eNode-Bs 702 may include one or more transceivers for communicating with the WTRUs 752 over air interface 764. Optionally, eNode-Bs 702 may implement MIMO technology. Thus, one of eNode-Bs 702, for example, may use multiple antennas to transmit wireless signals to, or receive wireless signals from, one of WTRUs 752.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 756 shown in FIG. 7 may include a mobility management gateway or entity (MME) 704, a serving gateway 706, or a packet data network (PDN) gateway 708. While each of the foregoing elements are depicted as part of core network 756, it will be appreciated that any one of these elements may be owned or operated by an entity other than the core network operator.

MME 704 may be connected to each of eNode-Bs 702 in RAN 754 via an S1 interface and may serve as a control node. For example, MME 704 may be responsible for authenticating users of WTRUs 752, bearer activation or deactivation, selecting a particular serving gateway during an initial attach of WTRUs 752, or the like. MME 704 may also provide a control plane function for switching between RAN 754 and other RANs (not shown) that employ other radio technologies, such as GSM or WCDMA.

Serving gateway 706 may be connected to each of eNode-Bs 702 in RAN 754 via the S1 interface. Serving gateway 706 may generally route or forward user data packets to or from the WTRUs 752. Serving gateway 706 may also perform other functions, such as anchoring user planes during inter-eNode B handovers, triggering paging when downlink data is available for WTRUs 752, managing or storing contexts of WTRUs 752, or the like.

Serving gateway 706 may also be connected to PDN gateway 708, which may provide WTRUs 752 with access to packet-switched networks, such as Internet 760, to facilitate communications between WTRUs 752 and IP-enabled devices.

Core network 756 may facilitate communications with other networks. For example, core network 756 may provide WTRUs 752 with access to circuit-switched networks, such as PSTN 758, such as through IMS core 764, to facilitate communications between WTRUs 752 and traditional land-line communications devices. In addition, core network 756 may provide the WTRUs 752 with access to other networks 762, which may include other wired or wireless networks that are owned or operated by other service providers.

Figure 8:
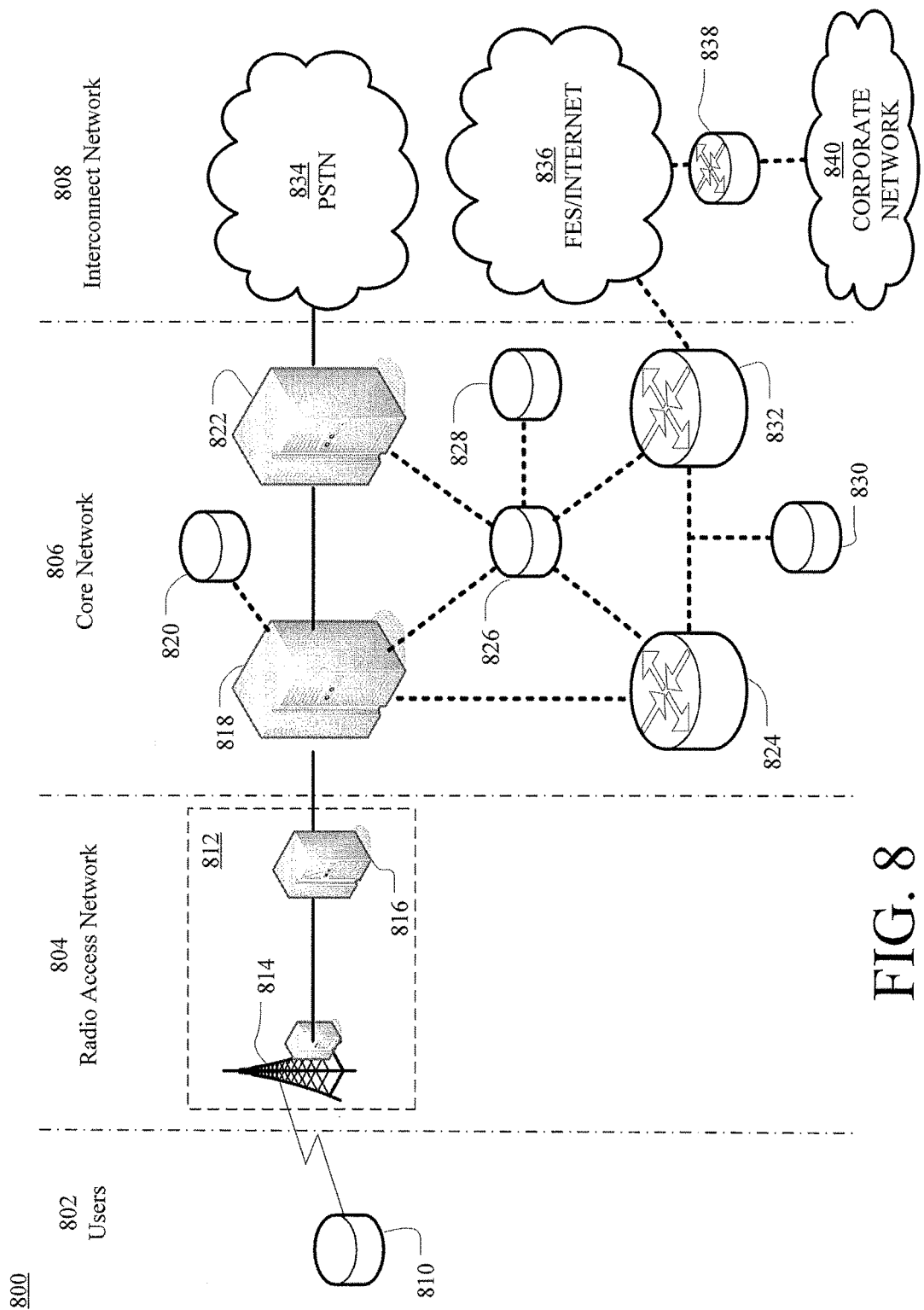
FIG. 8 illustrates an example architecture of a GPRS network.

FIG. 8 illustrates an architecture of a typical GPRS network 800 as described herein. The architecture depicted in FIG. 8 may be segmented into four groups: users 802, RAN 804, core network 806, and interconnect network 808. Users 802 comprise a plurality of end users, who each may use one or more devices 810. Note that device 810 is referred to as a mobile subscriber (MS) in the description of network shown in FIG. 8. In an example, device 810 comprises a communications device (e.g., a mobile device, a mobile positioning center, a network device, a detected device or the like, or any combination thereof). Radio access network 804 comprises a plurality of BSSs such as BSS 812, which includes a BTS 814 and a BSC 816. Core network 806 may include a host of various network elements. As illustrated in FIG. 8, core network 806 may comprise MSC 818, service control point (SCP) 820, gateway MSC (GMSC) 822, SGSN 824, home location register (HLR) 826, authentication center (AuC) 828, domain name system (DNS) server 830, and GGSN 832. Interconnect network 808 may also comprise a host of various networks or other network elements. As illustrated in FIG. 8, interconnect network 808 comprises a PSTN 834, an FES/Internet 836, a firewall 1038, or a corporate network 840.

An MSC can be connected to a large number of BSCs. At MSC 818, for instance, depending on the type of traffic, the traffic may be separated in that voice may be sent to PSTN 834 through GMSC 822, or data may be sent to SGSN 824, which then sends the data traffic to GGSN 832 for further forwarding.

When MSC 818 receives call traffic, for example, from BSC 816, it sends a query to a database hosted by SCP 820, which processes the request and issues a response to MSC 818 so that it may continue call processing as appropriate.

HLR 826 is a centralized database for users to register to the GPRS network. HLR 826 stores static information about the subscribers such as the International Mobile Subscriber Identity (IMSI), subscribed services, or a key for authenticating the subscriber. HLR 826 also stores dynamic subscriber information such as the current location of the MS. Associated with HLR 826 is AuC 828, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 8, when MS 810 initiates the attach process by turning on the network capabilities of the mobile device, an attach request is sent by MS 810 to SGSN 824. The SGSN 824 queries another SGSN, to which MS 810 was attached before, for the identity of MS 810. Upon receiving the identity of MS 810 from the other SGSN, SGSN 824 requests more information from MS 810. This information is used to authenticate MS 810 together with the information provided by HLR 826. Once verified, SGSN 824 sends a location update to HLR 826 indicating the change of location to a new SGSN, in this case SGSN 824. HLR 826 notifies the old SGSN, to which MS 810 was attached before, to cancel the location process for MS 810. HLR 826 then notifies SGSN 824 that the location update has been performed. At this time, SGSN 824 sends an Attach Accept message to MS 810, which in turn sends an Attach Complete message to SGSN 824.

Next, MS 810 establishes a user session with the destination network, corporate network 840, by going through a Packet Data Protocol (PDP) activation process. Briefly, in the process, MS 810 requests access to the Access Point Name (APN), for example, UPS.com, and SGSN 824 receives the activation request from MS 810. SGSN 824 then initiates a DNS query to learn which GGSN 832 has access to the UPS.com APN. The DNS query is sent to a DNS server within core network 806, such as DNS server 830, which is provisioned to map to one or more GGSNs in core network 806. Based on the APN, the mapped GGSN 832 can access requested corporate network 840. SGSN 824 then sends to GGSN 832 a Create PDP Context Request message that contains necessary information. GGSN 832 sends a Create PDP Context Response message to SGSN 824, which then sends an Activate PDP Context Accept message to MS 810.

Once activated, data packets of the call made by MS 810 can then go through RAN 804, core network 806, and interconnect network 808, in a particular FES/Internet 836 (and in embodiments a firewall), to reach corporate network 840.

Figure 9:
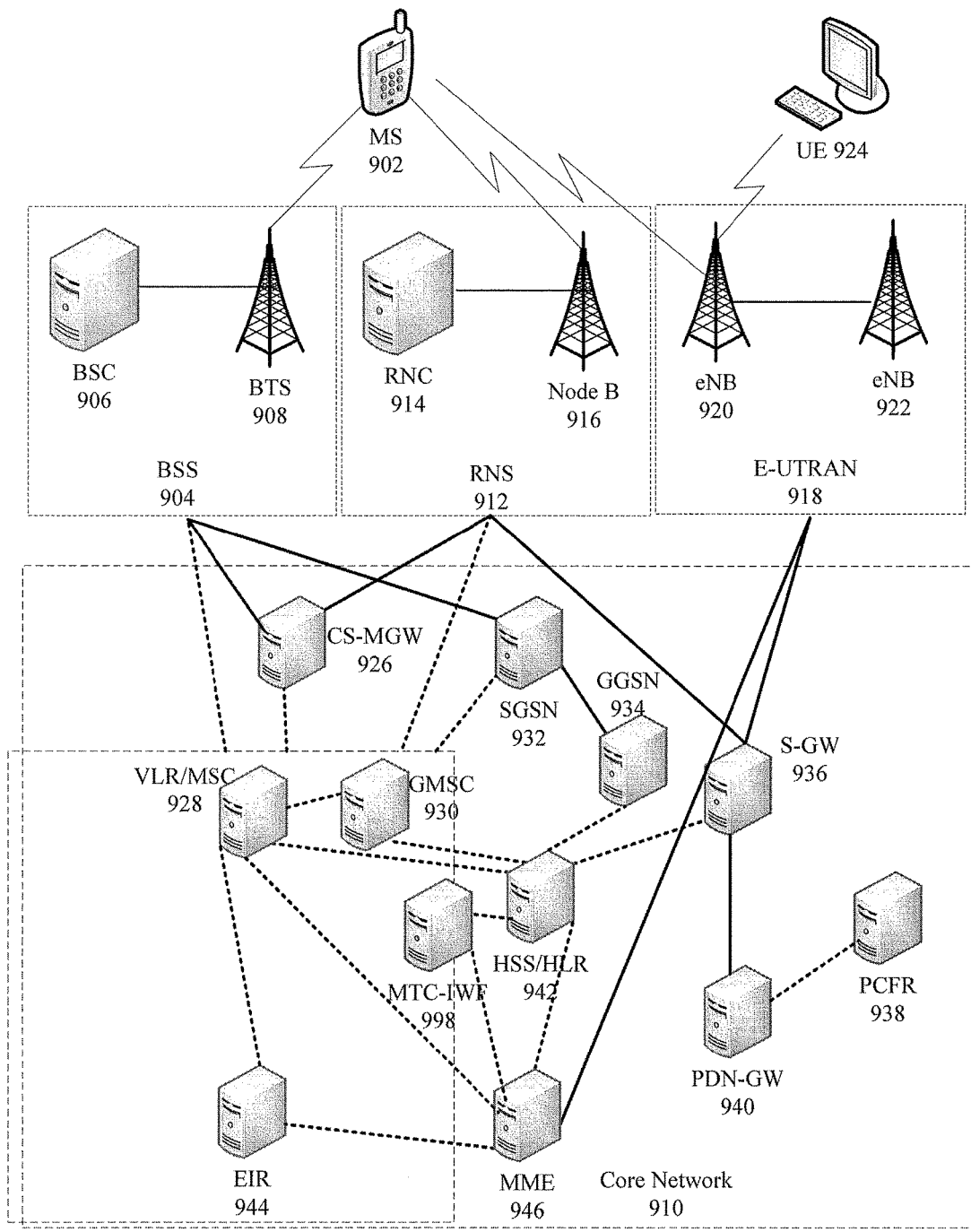
FIG. 9 is a block diagram of an example public land mobile network (PLMN).

FIG. 9 illustrates a PLMN block diagram view of an example architecture that may be replaced by a telecommunications system. In FIG. 9, solid lines may represent user traffic signals, and dashed lines may represent support signaling. MS 902 is the physical equipment used by the PLMN subscriber. For example, a network device, another electronic device, the like, or any combination thereof may serve as MS 902. MS 902 may be one of, but not limited to, a cellular telephone, a cellular telephone in combination with another electronic device or any other wireless mobile communication device.

MS 902 may communicate wirelessly with BSS 904. BSS 904 contains BSC 906 and a BTS 908. BSS 904 may include a single BSC 906/BTS 908 pair (base station) or a system of BSC/BTS pairs that are part of a larger network. BSS 904 is responsible for communicating with MS 902 and may support one or more cells. BSS 904 is responsible for handling cellular traffic and signaling between MS 902 and a core network 910. Typically, BSS 904 performs functions that include, but are not limited to, digital conversion of speech channels, allocation of channels to mobile devices, paging, or transmission/reception of cellular signals.

Additionally, MS 902 may communicate wirelessly with RNS 912. RNS 912 contains a Radio Network Controller (RNC) 914 and one or more Nodes B 916. RNS 912 may support one or more cells. RNS 912 may also include one or more RNC 914/Node B 916 pairs or alternatively a single RNC 914 may manage multiple Nodes B 916. RNS 912 is responsible for communicating with MS 902 in its geographically defined area. RNC 914 is responsible for controlling Nodes B 916 that are connected to it and is a control element in a UMTS radio access network. RNC 914 performs functions such as, but not limited to, load control, packet scheduling, handover control, security functions, or controlling MS 902 access to core network 910.

An E-UTRA Network (E-UTRAN) 918 is a RAN that provides wireless data communications for MS 902 and UE 924. E-UTRAN 918 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 918 may include of series of logical network components such as E-UTRAN Node B (eNB) 920 and E-UTRAN Node B (eNB) 922. E-UTRAN 918 may contain one or more eNBs. User equipment (UE) 924 may be any mobile device capable of connecting to E-UTRAN 918 including, but not limited to, a personal computer, laptop, mobile device, wireless router, or other device capable of wireless connectivity to E-UTRAN 918. The improved performance of the E-UTRAN 918 relative to a typical UMTS network allows for increased bandwidth, spectral efficiency, and functionality including, but not limited to, voice, high-speed applications, large data transfer or IPTV, while still allowing for full mobility.

Typically MS 902 may communicate with any or all of BSS 904, RNS 912, or E-UTRAN 918. In a illustrative system, each of BSS 904, RNS 912, and E-UTRAN 918 may provide MS 902 with access to core network 910. Core network 910 may include of a series of devices that route data and communications between end users. Core network 910 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 926 is part of core network 910, and interacts with VLR/MSC server 928 and GMSC server 930 in order to facilitate core network 910 resource control in the CS domain. Functions of CS-MGW 926 include, but are not limited to, media conversion, bearer control, payload processing or other mobile network processing such as handover or anchoring. CS-MGW 926 may receive connections to MS 902 through BSS 904 or RNS 912.

SGSN 932 stores subscriber data regarding MS 902 in order to facilitate network functionality. SGSN 932 may store subscription information such as, but not limited to, the IMSI, temporary identities, or PDP addresses. SGSN 932 may also store location information such as, but not limited to, GGSN address for each GGSN 934 where an active PDP exists. GGSN 934 may implement a location register function to store subscriber data it receives from SGSN 932 such as subscription or location information.

Serving gateway (S-GW) 936 is an interface which provides connectivity between E-UTRAN 918 and core network 910. Functions of S-GW 936 include, but are not limited to, packet routing, packet forwarding, transport level packet processing, or user plane mobility anchoring for inter-network mobility. PCRF 938 uses information gathered from PGW 936, as well as other sources, to make applicable policy and charging decisions related to data flows, network resources or other network administration functions. PDN gateway (PDN-GW) 940 may provide user-to-services connectivity functionality including, but not limited to, GPRS/EPC network anchoring, bearer session anchoring and control, or IP address allocation for PS domain connections.

HSS 942 is a database for user information and stores subscription data regarding MS 902 or UE 924 for handling calls or data sessions. Networks may contain one HSS 942 or more if additional resources are required. Example data stored by HSS 942 include, but is not limited to, user identification, numbering or addressing information, security information, or location information. HSS 942 may also provide call or session establishment procedures in both the PS and CS domains.

VLR/MSC Server 928 provides user location functionality. When MS 902 enters a new network location, it begins a registration procedure. A MSC server for that location transfers the location information to the VLR for the area. A VLR and MSC server may be located in the same computing environment, as is shown by VLR/MSC server 928, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 902 registration or procedures for handover of MS 902 to a different section of core network 910. GMSC server 930 may serve as a connection to alternate GMSC servers for other MSs in larger networks.

EIR 944 is a logical element which may store the IMEI for MS 902. User equipment may be classified as either "white listed" or "black listed" depending on its status in the network. If MS 902 is stolen and put to use by an unauthorized user, it may be registered as "black listed" in EIR 944, preventing its use on the network. A MME 946 is a control node which may track MS 902 or UE 924 if the devices are idle. Additional functionality may include the ability of MME 946 to contact idle MS 902 or UE 924 if retransmission of a previous session is required.

MTC-IWF 998 is shown communicatively coupled to MME 946 and HSS/HLR 942. Other functionality may be included as described herein, and further, other communicative connections may exist between MTC-IWF 998 and other elements. More generally, FIG. 9 and other network images herein are, at times, provided for purposes of technical context and may include aspects unnecessary for full functionality of systems and methods disclosed herein. For example, EIR 944 may, but need not, be excluded in embodiments of the arrangement shown in FIG. 9 in conjunction with techniques disclosed.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

What is claimed is:

1. A system, comprising:
    a communication interworking function configured to interpret an application request from an application server or user equipment, the communication interworking function further configured to resolve routing for the application request based on application request information and a real-time integrated mapping table; and
    a mapping function of the communication interworking function configured to maintain the real-time integrated mapping table of the user equipment and the application server based on entity information from an entity database.
2. The system of claim 1, the real-time integrated mapping table including communication attributes.
3. The system of claim 2, further comprising a layered feedback control function configured to monitor at least one interface for an overload condition based on interface traffic data, the communication attributes including at least the interface traffic data, the layered feedback control function further configured to mitigate the overload condition based on detection of the overload condition.
4. The system of claim 1, the routing is based on a recipient serving node determined from the real-time integrated mapping table.
5. The system of claim 1, the real-time integrated mapping table further includes the application request, the application request associated with a request reference number.
6. The system of claim 1, the mapping function configured to update the real-time integrated mapping table based on a change to the user equipment, the application server, or intermediary network elements.
7. A method, comprising:
    providing a communication interworking function having a mapping function;
    invoking the mapping function of the communication interworking function in response to an application request, the mapping function maintaining a real-time integrated mapping table of user equipment and an application server associated with the application request based on entity information from an entity database;
    extracting application server information associated with the application server from an entity database, the application server information including an identity of a serving node of the application server; and
    determining a routing to the application server based on the application server information and the serving node.
8. The method of claim 7, the real-time integrated mapping table further includes the application request, the application request associated with a request reference number.
9. The method of claim 7, further comprising updating the real-time integrated mapping table based on a change to the user equipment, the application server, or intermediary network elements.
10. The method of claim 7, further comprising transmitting the application request and at least a portion of the application server information from the communication interworking function to the serving node.
11. The method of claim 7, the application request is received at an intermediary network element before being transmitted to the communication interworking function.
12. The method of claim 7, further comprising monitoring at least one interface for an overload condition based on interface traffic data and communication attributes.
13. The method of claim 12, further comprising mitigating the overload condition based on detection of the overload condition.
14. A method, comprising:
    providing a communication interworking function having a mapping function;
    invoking a mapping function of the communication interworking function in response to an application request, the mapping function maintaining a real-time integrated mapping table of user equipment and an application server associated with the application request based on entity information from an entity database;
    extracting user equipment information associated with the user equipment from an entity database, the user equipment information including an identity of a serving node of the user equipment; and
    determining a routing to the user equipment based on the user equipment information and the serving node.
15. The method of claim 14, further comprising receiving the application request originating at the application server and directed to an application interacting with user equipment, the application associated with the application server.
16. The method of claim 15, further comprising transmitting the application request to a communication interworking function for routing the application request to the user equipment.

17. The method of claim 14, further comprising transmitting the application request to the user equipment based on the routing.

18. The method of claim 14, the real-time integrated mapping table including one or more of an equipment identifier associated with the user equipment, a server identifier associated with the application server, and communication attributes.

19. The method of claim 14, further comprising updating the real-time integrated mapping table based on a change to the user equipment, the application server, or intermediary network elements.

20. The method of claim 14, the application request is received at an intermediary network element before being transmitted to the communication interworking function.

* * * * *